(12) United States Patent
Park et al.

(10) Patent No.: US 11,328,469 B2
(45) Date of Patent: May 10, 2022

(54) ELECTRONIC DEVICE AND METHOD FOR PROVIDING DRAWING ENVIRONMENT

(71) Applicant: Samsung Electronics Co., Ltd., Suwon-si (KR)

(72) Inventors: Sungwoo Park, Suwon-si (KR); Yoonchan Choi, Suwon-si (KR); Hyungjoo Jin, Suwon-si (KR); Sungjun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/267,015

(22) PCT Filed: Apr. 25, 2019

(86) PCT No.: PCT/KR2019/005018
§ 371 (c)(1),
(2) Date: Feb. 8, 2021

(87) PCT Pub. No.: WO2020/032347
PCT Pub. Date: Feb. 13, 2020

(65) Prior Publication Data
US 2021/0304482 A1    Sep. 30, 2021

(30) Foreign Application Priority Data

Aug. 8, 2018   (KR) .......................  10-2018-0092455

(51) Int. Cl.
*G06T 13/80*     (2011.01)
*G06F 3/0488*    (2013.01)
(Continued)

(52) U.S. Cl.
CPC .......... *G06T 13/80* (2013.01); *G06F 3/04883* (2013.01); *G06T 11/001* (2013.01); *G06T 11/203* (2013.01)

(58) Field of Classification Search
None
See application file for complete search history.

(56) References Cited

U.S. PATENT DOCUMENTS 9,421,459 B2     8/2016  Ikeda
2013/0212535 A1  8/2013  Kim
(Continued)

FOREIGN PATENT DOCUMENTS

JP    2016-110676 A    6/2016
JP    2017-175419 A    9/2017
(Continued)

OTHER PUBLICATIONS

International Search Report dated Aug. 12, 2019 in connection with International Patent Application No. PCT/KR2019/005018, 2 pages.
(Continued)

*Primary Examiner* — Jeffrey J Chow

(57) ABSTRACT

An electronic device according to various embodiments of the present invention includes: a touch screen display; a processor operatively connected to the display; and a memory operatively connected to the processor. The memory may include instructions which, when executed, cause the processor to: display, on the display, a user interface including a first section configured to receive a drawing input and a second section including a plurality of colors and one or more line widths, which are to be selected for the drawing input; execute an animation image file to be displayed on the first section, the animation image file including a procedure of drawing an object with at least one color among the plurality of colors and at least one line width among the one or more line widths; receive, from the display, an input for stopping the execution of the image file; and display a drawing output on the display according to the drawing input, the drawing output including at least one among the color and the line width used when the drawing input is received. Various other embodiments are also possible.

14 Claims, 17 Drawing Sheets

(51) Int. Cl.
    *G06T 11/00*     (2006.01)
    *G06T 11/20*     (2006.01)
    *G06F 3/04883*     (2022.01)

(56) References Cited

U.S. PATENT DOCUMENTS

| | | | |
|---|---|---|---|
| 2015/0135129 A1 | 5/2015 | Kwon et al. | |
| 2015/0339051 A1* | 11/2015 | Yang | G06F 3/0482 |
| | | | 382/189 |
| 2016/0049094 A1* | 2/2016 | Gupta | G09B 9/00 |
| | | | 434/185 |
| 2017/0278549 A1 | 9/2017 | Tamura et al. | |

FOREIGN PATENT DOCUMENTS

| | | |
|---|---|---|
| KR | 10-0874044 B1 | 12/2008 |
| KR | 10-2013-0027973 A | 3/2013 |
| KR | 10-2013-0092934 A | 8/2013 |
| KR | 10-2015-0010898 A | 1/2015 |
| KR | 10-2015-0055292 A | 5/2015 |
| KR | 10-1725068 B1 | 4/2017 |
| KR | 10-2018-0045169 A | 5/2018 |

OTHER PUBLICATIONS

Written Opinion of the International Searching Authority dated Aug. 12, 2019 in connection with International Patent Application No. PCT/KR2019/005018, 3 pages.

* cited by examiner

ELECTRONIC DEVICE AND METHOD FOR PROVIDING DRAWING ENVIRONMENT

CROSS-REFERENCE TO RELATED APPLICATIONS

This application is a 371 of International Application No. PCT/KR2019/005018 filed on Apr. 25, 2019, which claims priority to Korean Patent Application No. 10-2018-0092455 filed on Aug. 8, 2018, the disclosures of which are herein incorporated by reference in their entirety.

BACKGROUND

1. Field

Various embodiments of the disclosure relate to an electronic device configured such that a picture can be drawn on a picture board by using an animation playback screen as a sketch.

2. Description of Related Art

An electronic device may have a touch sensitive display, provide a picture board through the touch sensitive display, and provide a user with a drawing environment in which a picture can be drawn on the picture board with a finger or a stylus pen.

The electronic device may provide a function of displaying a specific image so as to overlap the picture board, a so-called layer function. For example, the electronic device may divide a process in which a sketch is finished according to a stage and show the processes in order. The electronic device may provide an outline of the sketch by depicting the outline of the sketch with, for instance, a dotted line. Thus, a user may adopt the specific image as the sketch to draw a desired picture.

According to various embodiments of the disclosure, an electronic device provides information showing by which tool and method a sketch is made, and thereby can provide a drawing environment in which even a complicated picture can be easily drawn with reference thereto.

According to various embodiments of the disclosure, an electronic device automatically configures attributes applied to a sketch as attributes of a picture board, and thereby can provide a drawing environment in which a user can easily learn a complicated picture without a need to troublesomely configure the attributes of the picture board.

SUMMARY

An electronic device according to various embodiments of the disclosure may include: a touchscreen display; a processor operatively connected to the display; and a memory operatively connected to the processor. The memory may include instructions that, when executed, cause the processor to: display, on the display, a user interface including a first section configured to receive a drawing input and a second section including multiple hues and one or more line widths to be selected for the drawing input; execute an animation image file to be displayed on the first section, the animation image file including an order in which an object is drawn by using at least one hue among the multiple hues and at least one line width among the one or more line widths; receive an input for stopping executing the image file from the display; and display a drawing output on the display according to the drawing input, the drawing output including at least one of a hue and a line width used when the drawing input is received.

A method for operating an electronic device according to various embodiments of the disclosure may include the operations of: displaying, on a touchscreen display, a user interface including a first section configured to receive a drawing input and a second section including multiple hues and one or more line widths to be selected for the drawing input; executing an animation image file to be displayed on the first section, the animation image file including an order in which an object is drawn by using at least one hue among the multiple hues and at least one line width among the one or more line widths; receiving an input for stopping executing the image file from the display; and displaying a drawing output on the display according to the drawing input, the drawing output including at least one of a hue and a line width used when the drawing input is received.

According to various embodiments of the disclosure, an electronic device enables a user to easily draw a picture by following another picture in real time above an animation that shows a picture-drawing process. This enables the user to easily learn a drawing technique.

DETAILED DESCRIPTION

Figure 1:
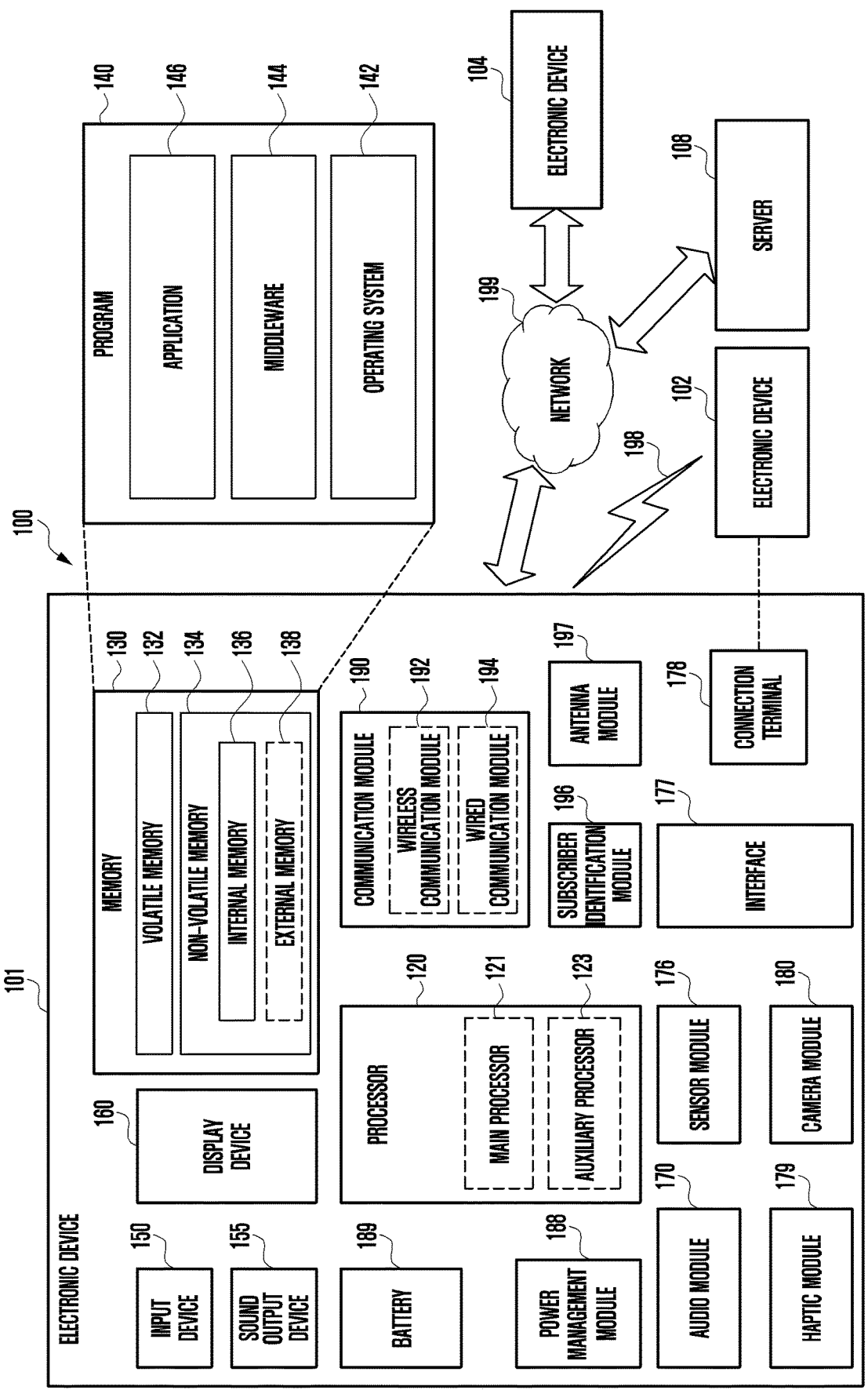
FIG. 1 illustrates an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
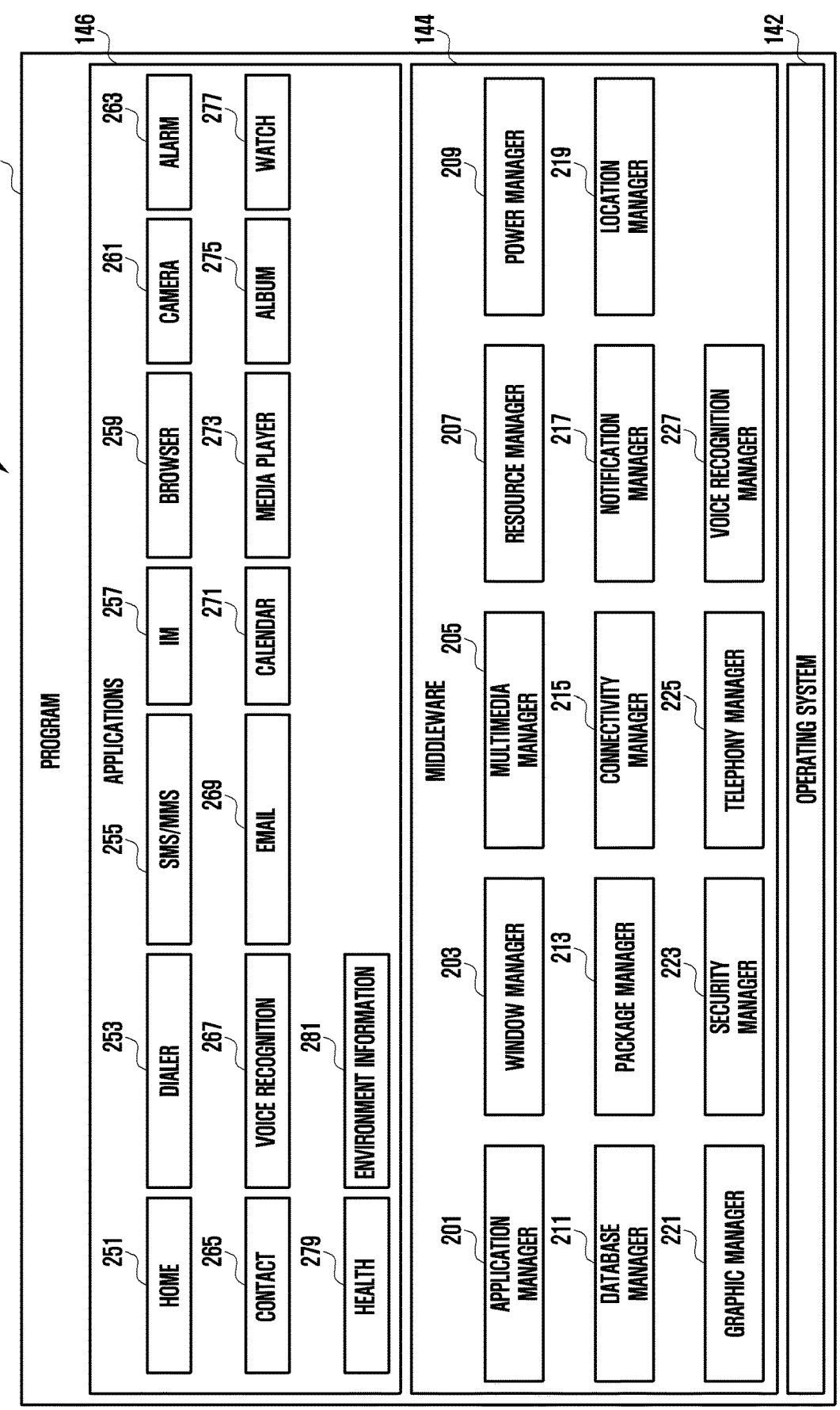
FIG. 2 is a block diagram of a program module according to various embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3A:
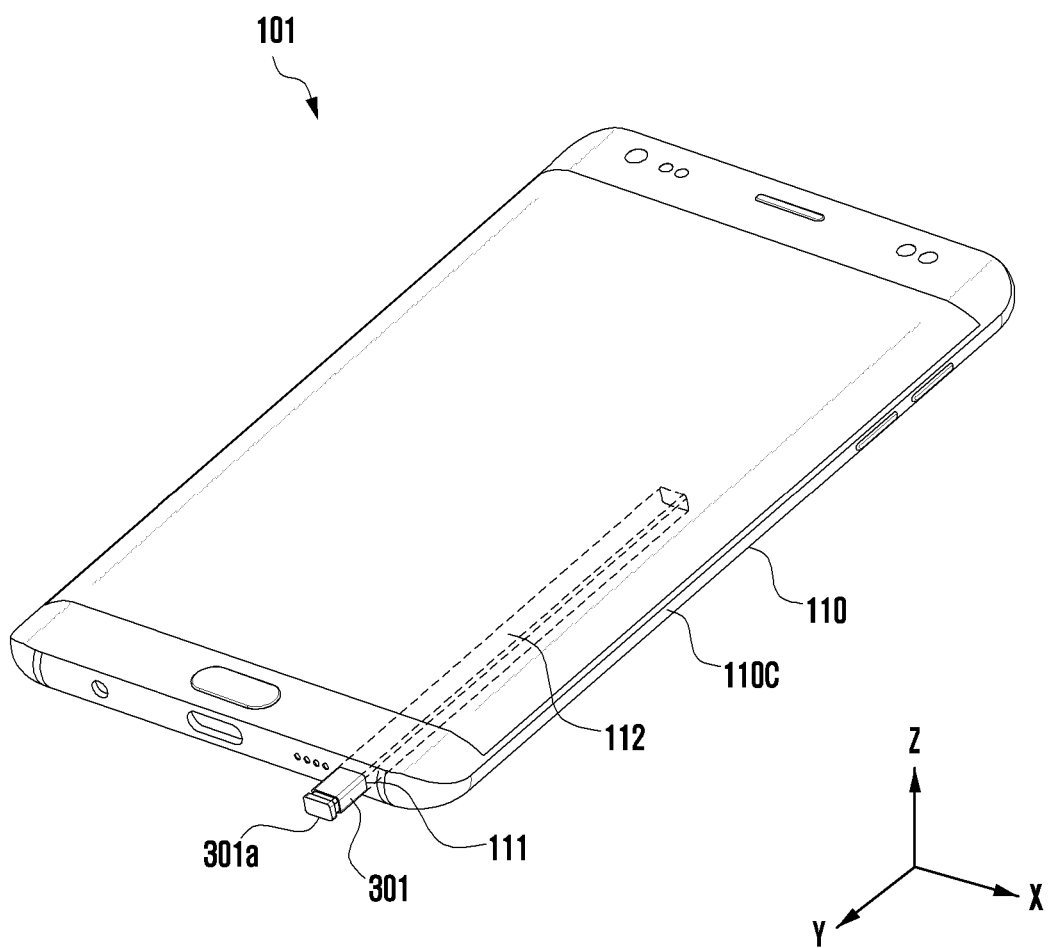
FIG. 3A is a perspective view of an electronic device of an embodiment, which includes a digital pen.

FIG. 3A is a perspective view of an electronic device 101 of an embodiment, which includes a digital pen 301. Referring to FIG. 3A, the electronic device 101 of an embodiment may include the configuration illustrated in FIG. 1, and include a structure into which a digital pen 301 (for example, a stylus pen) may be inserted. The electronic device 101 may include a housing 110, and include a hole 111 in a portion of the housing, for example a portion of a lateral surface 110C. The electronic device 101 may include a storage space 112 connected with the hole 111, and the digital pen 301 may be inserted into the storage space 112. According to the illustrated embodiment, the digital pen 301 may include a pushable button 301a at one end thereof so as to easily pull the digital pen 301 out of the storage space 112 of the electronic device 101. If the button 301a is pushed, repulsion mechanisms (for example, at least one spring) configured in connection with the button 301a may be operated, and the digital pen 301 may be separated from the storage space 112.

Figure 3B:
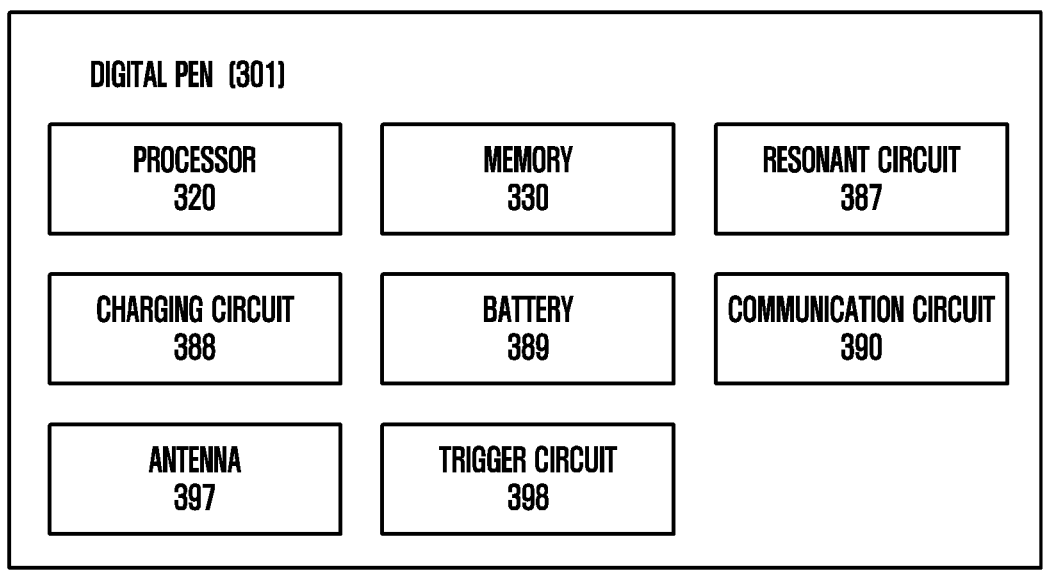
FIG. 3B is a block diagram illustrating a digital pen of an embodiment.

FIG. 3B is a block diagram illustrating a digital pen 301 of an embodiment. Referring to FIG. 3B, the digital pen 301 according to an embodiment may include a processor 320, a memory 330, a resonant circuit 387, a charging circuit 388, a battery 389, a communication circuit 390, an antenna 397, and/or a trigger circuit 398. In some embodiments, the processor 320, at least a part of the resonant circuit 387, and/or at least a part of the communication circuit 390 of the digital pen 301 may be configured on a printed circuit board or in a chip form. The processor 320, the resonant circuit 387, and/or the communication circuit 390 may be electrically connected to the memory 330, the charging circuit 388, the battery 389, the antenna 397, or the trigger circuit 398. The digital pen 301 according to an embodiment may be made up of only the resonant circuit and the button.

The processor 320 may include a generic processor that is configured to execute a customized hardware module or software (for example, an application program). The processor may include hardware elements (functions) or software elements (programs) that include at least one of various sensors provided on the digital pen 301, a data measurement module, an input/output interface, a module that manages a state or an environment of the digital pen 301, or a communication module. The processor 320 may include, for example, one of hardware, software, or firmware, or a combination of two or more thereof. According to an embodiment, the processor 320 may receive a proximity signal that corresponds to an electromagnetic field signal generated from a digitizer 160 of the electronic device 101 through the resonant circuit 387. If the proximity signal is identified, the resonant circuit 387 may be controlled to transmit an electro-magnetic resonance (EMR) input signal to the electronic device 101.

The memory 330 may store information related to operations of the digital pen 301. For example, the information may include information for communication with the electronic device 101, and frequency information related to an input operation of the digital pen 301.

The resonant circuit 387 may include at least one of a coil, an inductor, or a capacitor. The resonant circuit 387 may be used in the digital pen 301 generating a signal including a resonant frequency. For example, to generate the signal, the digital pen 301 may use at least one of an electro-magnetic resonance (EMR) scheme, an active electrostatic (AES) scheme, or an electrically coupled resonance (ECR) scheme. In the case where the digital pen 301 transmits a signal using the EMR scheme, the digital pen 301 may generate a signal including a resonant frequency on the basis of an electromagnetic field generated from an inductive panel of the electronic device 101. In the case where the digital pen 301 transmits a signal using the AES scheme, the digital pen 301 may generate a signal using capacity coupling with the electronic device 101. In the case where the digital pen 301 transmits a signal using the ECR scheme, the digital pen 301 may generate a signal including a resonant frequency on the basis of an electric field generated from a capacitive unit of the electronic device. According to an embodiment, the resonant circuit 387 may be used to change the intensity or the frequency of an electromagnetic field depending on the operation state of a user. For example, the resonant circuit 387 may provide a frequency for recognizing a hovering input, a drawing input, a button input, or an erasing input.

When connected to the resonant circuit 387 on the basis of a switching circuit, the charging circuit 388 may rectify a resonant signal generated from the resonant circuit 387 into a direct current signal, and may provide the direct current signal to the battery 389. According to an embodiment the digital pen 301 may identify whether the digital pen 301 is inserted into the electronic device 101 by using a voltage level of the direct current signal detected from the charging circuit 388.

The battery 389 may be configured to store power required for an operation of the digital pen 301. The battery may include, for example, a lithium-ion battery or a capacitor, and may be a rechargeable battery or a disposable battery. According to an embodiment, the battery 389 may be charged with power for example, a direct current signal (direct current power)), provided from the charging circuit 388.

The communication circuit 390 may be configured to perform a wireless communication function between the digital pen 301 and the communication module 190 of the electronic device 101. According to an embodiment, the communication circuit 390 may transmit state information and input information of the digital pen 301 to the electronic device 101 by using a short-range communication scheme. For example, the communication circuit 390 may transmit, to the electronic device 101, direction information (e.g., motion sensor data) of the digital pen 301 obtained via the trigger circuit 398 sound information input via a microphone, or discharged level information of the battery 389. For example, the short-range communication scheme may include at least one of Bluetooth, Bluetooth low energy (BLE), or a wireless LAN.

The antenna 397 may be used for transmitting or receiving a signal or power to or from the outside (for example, the electronic device 101). According to an embodiment, the digital pen 301 may include a plurality of antennas 397, and may select at least one antenna 397 suitable for a communication scheme among the plurality of antennas 397. Via the at least one selected antenna 397, the communication circuit 390 may exchange a signal or power with an external electronic device.

The trigger circuit 398 may include at least one button or a sensor circuit. According to an embodiment, the processor 320 may identify an input mode (for example, a touch or a push), or a type (for example, an EMR button or a BLE button) of the button of the digital pen 301. According to an embodiment, the sensor circuit may generate an electric signal or a data value corresponding to an internal operation state or an external environment state of the digital pen 301. For example, the sensor circuit may include at least one of a motion sensor, a sensor for detecting a discharged level of a battery, a pressure sensor, an optical sensor, a temperature sensor, an earth magnetic field sensor, and a biometric sensor. According to an embodiment, the trigger circuit 398 may transmit a trigger signal to the electronic device 101 by using an input signal of a button or a signal from a sensor.

Figure 4:
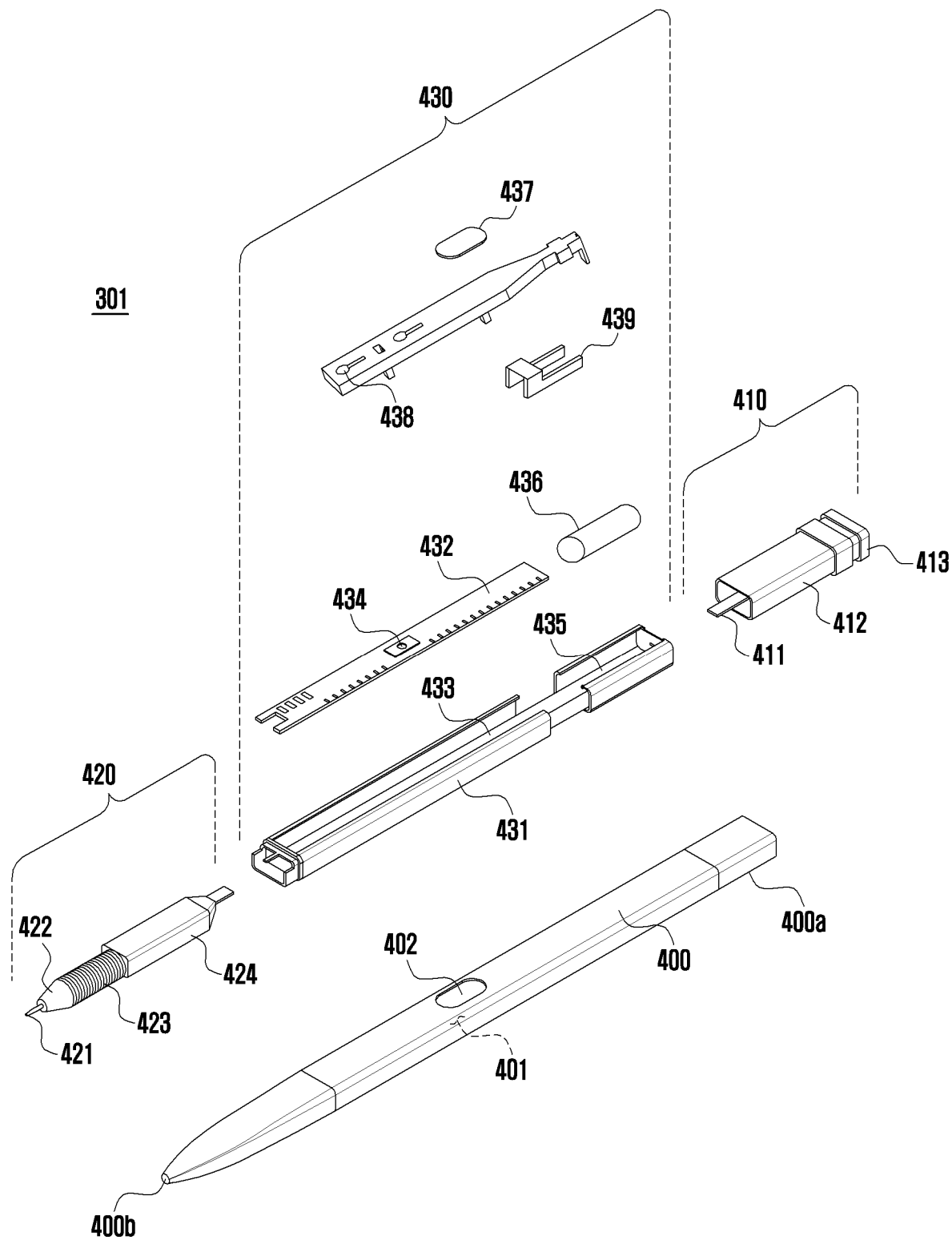
FIG. 4 is an exploded perspective view of a digital pen according to an embodiment.

FIG. 4 is an exploded perspective view of a digital pen 301 according to an embodiment. Referring to FIG. 4, the digital pen 301 may include a pen housing 400 forming an appearance of the digital pen 301, and an inner assembly inside the pen housing 400. In the illustrated embodiment, the inner assembly may include various components mounted in the pen, and may be inserted into the pen housing 400 via a single assembly operation.

The pen housing 400 may have an elongated shape extended between a first end 400a and a second end 400b and may include a storage space 112 inside the housing 400. The pen housing 400 may be provided in an oval shape in which a cross section consists of a major axis and a minor axis, and may be provided in a cylindroid shape on the whole. The storage space 401 of the electronic device 101 may also be provided in an oval shape in cross section depending on the shape of the pen housing 400. The pen housing 400 may include synthetic resins (e.g., plastic) and/or metallic materials (e.g., aluminum). According to an embodiment, the second end 400b of the pen housing 400 may be made of synthetic resins.

The inner assembly may have an elongated shape depending on the shape of the pen housing 400. The inner assembly may briefly be divided into three configurations in a longitudinal direction. For example, the inner assembly may include an ejection member 410 disposed at a position corresponding to the first end 400a of the pen housing 400, a coil part 420 disposed at a position corresponding to the second end 400b of the pen housing 400, and a circuit board part 430 disposed at a position corresponding to a body of the housing.

The ejection member 410 may include a configuration for removing the digital pen 301 from the storage space 112 of the electronic device 101. According to an embodiment, the ejection member 410 may include a shaft 411, an ejection body 412 that is disposed around the shaft 411 and forms the overall appearance of the ejection member 410, and a button part 413. If the inner assembly is completely inserted into the pen housing 400, the portion including the shaft 411 and the ejection body 412 may be enclosed by the first end 400a of the pen housing 400, and the button part 413 (e.g., 301a in FIG. A) may be exposed to the outside of the first end 400a. A plurality of components (not illustrated), for example, cam members or elastic members may be disposed inside the ejection body 412, and may have a push-pull structure. In an embodiment, the button part 413 may be substantially coupled with the shaft 411, may perform a to-and-fro motion with respect to the ejection body 412. According to various embodiments, the button part 413 may include a button having an engaging structure so as to enable a user to remove the digital pen 301 using a fingernail. According to an embodiment, the digital pen 301 may include a sensor for detecting a to-and-fro motion of the shaft 411, and may provide another input mode.

The coil part 420 may include a pen tip 421 that is exposed to the outside of the second end 400b when the inner assembly is completely inserted into the pen housing 400, a packing ring 422, a coil 423 that is wound multiple times, and/or a pen pressure sensing part 424 for obtaining a change in pressure according to a pressure provided by the pen tip 421. The packing ring 422 may include epoxy, rubber, urethane, or silicone. The packing ring 422 may be used for protection against water and dust, and may protect the coil part 420 and the circuit board part 430 from water or dust. According to an embodiment, the coil 423 may generate a resonant frequency at a preset frequency band (e.g., 500 kHz), and may adjust the resonant frequency generated by the coil 423 within a predetermined range by coupling with at least one element (e.g., a capacitor).

The circuit board part 430 may include a PCB 432, a base 431 that encloses at least one surface of the PCB 432, and an antenna. According to an embodiment, a board seating part 433 in which the PCB 432 is disposed may be provided on an upper surface of the base 431, and the PCB 432 may be fixed in a state in which the PCB 432 is seated in the board seating part 433. According to an embodiment, the PCB 432 may include an upper surface and a lower surface. A variable capacity capacitor or a switch 434 connected to the coil 423 may be disposed on the upper surface, and a charging circuit, a battery, or a communication circuit may be disposed on the lower surface. The battery may include an electric double layered capacitor (EDLC). The charging circuit may be disposed between the coil 423 and the battery, and may include a voltage detector circuit and a rectifier.

As in the example illustrated in FIG. 4, the antenna may include an antenna structure 439 and/or an antenna embedded in the PCB 432. According to various embodiments, the switch 434 may be installed on the PCB 432. A side button 437 installed in the digital pen 301 may be used for pushing the switch 434, and may be exposed to the outside via a lateral opening 402 of the pen housing 400. The side button 437 may be supported by a supporting member 438. When no external force is applied to the side button 437, the supporting member 438 may provide an elastic restoring force, and may restore or maintain the side button 437 to a state in which the side button 437 is disposed at a predetermined position.

The circuit board part 430 may include another packing ring such as an O-ring. For example, O-rings made of an elastic body may be disposed at opposite ends of the base 431, whereby a sealed structure may be formed between the base 431 and the pen housing 400. In any embodiment, the supporting member 438 may partly come into close contact with an inner wall of the pen housing 400 around the lateral opening 402, thereby providing a sealed structure. For example, the circuit board part 430 may provide a structure for protection against water and dust, which is similar to that of the packing ring 422 of the coil part 420.

The digital pen 301 may include a battery seating part 435 in which a battery 436 is disposed, on the upper surface of the base 431. The battery 436 that may be mounted in the battery seating part 435 may include, for example, a cylinder type battery.

The digital pen 301 may include a microphone (not illustrated). The microphone may be directly connected with the PCB 432, or may be connected to a separate flexible printed circuit board (FPCB) (not illustrated) that is connected to the PCB 432. According to various embodiments, the microphone may be disposed at a position parallel with the side button 437 in the longitudinal direction of the digital pen 301.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context dearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory," simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 5:
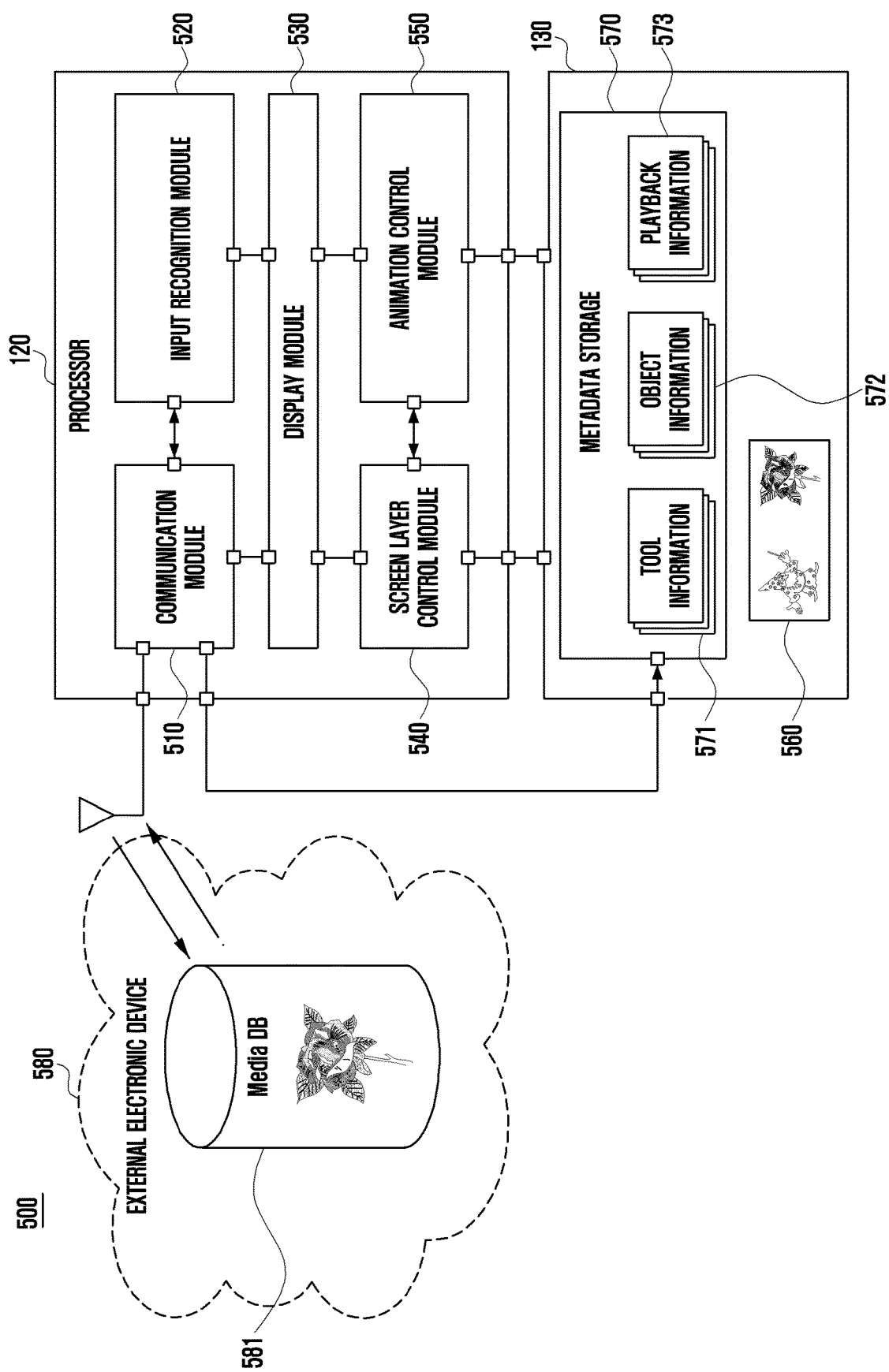
FIG. 5 illustrates a system configured to enable a user to make a drawing by using a sketch in accordance with various embodiments of the disclosure.

FIG. 5 illustrates a system 500 configured to enable a user to make a drawing using a sketch in accordance with various embodiments of the disclosure. Referring to FIG. 5, a processor (e.g., the processor 120 in FIG. 1) may include a communication module 510, an input recognition module 520, a display module 530, a screen layer control module 540, and an animation control module 550. A memory 130 may include an animation storage 560 and a metadata storage 570. An external electronic device 580 (e.g., the electronic device 104 or the server 108 in FIG. 1) may be one of various servers constituting a cloud system, may play a role of storage management and service management of an electronic device (e.g., the electronic device 101 in FIG. 1) connected to the cloud system, and may include a media database (DB) 581. The cloud system may include a third party server (e.g., a YouTube server). The third party server may provide an animation to the electronic device (e.g., the electronic device 101 in FIG. 1) via the external electronic device 580. The third party server may provide the animation to the electronic device 101 via a network at the request of the electronic device 101.

According to various embodiments, at least one of the modules 510, 520, 530, 540, and 550 may be configured in the electronic device 101 as separate hardware different from the processor 120. For example, the communication module 510 may be the communication module 190 in FIG. 1.

According to various embodiments, the modules 510, 520, 530, 540, and 550 may be software stored in the memory 130 (e.g., a drawing application or a painting application stored in the memory 130 in FIG. 1). Thus, the processor 120 may execute the modules 510, 520, 530, 540, and 550, and perform their operations.

According to various embodiments, the processor 120 may receive an animation (e.g., an animated image file), which is used as a sketch when a user makes a drawing on a picture board, from the cloud system (e.g., the external electronic device 580 or the third party server) via the communication module 510, and store the received animation in the animation storage 560. The processor may store the animation, which is generated from the electronic device 101 and is used as a sketch, in the animation storage 560, and transmit the animation to the external electronic device 580 via the communication module 510. In various embodiments, the animation may be a drawing animation that shows a process in which a picture is made. When the drawing animation is made, drawing related metadata (e.g., tool attribute information, object attribute information, and playback attribute information) may be generated together.

According to various embodiments, the processor 120 may receive metadata, which indicates attributes of the animation, from the cloud system (e.g., the external electronic device 580) via the communication module 510, and store the received metadata in the metadata storage 570. The processor 120 may store metadata of the animation generated from the electronic device 101 in the metadata storage 570, and transmit the metadata to the cloud system (e.g., the external electronic device 580) via the communication module 510.

According to various embodiments, the metadata storage 570 may show by which tool and method the drawing animation is made, and store drawing related metadata that shows which objects (for example, a tree, a petal, etc. as constituent elements of the picture having one or more hues and one or more line widths) constitute the drawing animation. The metadata may be generated together when the drawing animation is generated. According to an embodiment, the metadata storage 570 may include tool information 571 that indicates tool attributes such as a kind of drawing tool used when the drawing animation is made, a width of a line drawn on a picture board with the tool, a hue of the line, saturation of the line, brightness of the line, and so on, object information 572 that indicates object attributes such as a kind, a hue, brightness, and saturation of an object (a picture), and playback information 573 that indicates playback attributes such as a repeated playback section, a playback time when the attribute of the tool is changed, and an object change time.

According to various embodiments, the tool information 571 may include information that indicates a kind of the tool (e.g., a brush, a pen, a pencil, an eraser, or the like) used for each image constituting the drawing animation, and information that indicates a size of the used tool (e.g., a width of the line drawn on the picture with the tool). The object information 572 may include object data having values of hue, transparency, drawing frame, the number of strokes, and position of stroke of each object. The playback information 573 may include playback data having a value of, for instance, a timestamp corresponding to a whole playback time and repeated playback section of the drawing animation.

According to various embodiments, the processor 120 may recognize metadata, which is relevant to a tool used at a specific time (e.g., a current playback time or a playback stop time of the drawing animation), from the tool information 571, and configure the kind of the tool, the width of the line, and the hue of the line using the recognized metadata.

According to an embodiment, the drawing animation may be played via a display (e.g., the display device 160 in FIG. 1) (playback mode). The processor 120 may stop the playback of the drawing animation in response to a user input for converting from the playback mode to a drawing mode (e.g., a user touch input regarding the drawing animation that is being played back, or a user touch input regarding a pause button in a playback progress bar), change the operation mode from the playback mode to the drawing mode, and configure the kind of the tool, the width of the line, the hue of the line and so on using the recognized metadata. Accordingly, a user may adopt a drawing image at a time stopped in the drawing animation as a sketch, and make a drawing with the tool having the attribute information applied to the image at the stopped playback time without a need to directly configure the tool related attributes.

According to various embodiments, the processor 120 may recognize the hue, the transparency, etc. configured at a specific time from the object information 572 and/or the tool information 571, display the recognized hue, transparency, etc. on the display device 160 via the display module 530, and configure the recognized hue, transparency, etc. as the hue, the transparency, etc. of the tool. According to an embodiment, in response to the user input for changing the mode, the processor 120 may stop the playback of the drawing animation to change the mode, and configure the recognized hue, transparency, etc. as the hue, the transparency, etc. of the tool. Accordingly, a user may adopt an image at a time stopped in the drawing animation as a sketch, and make a drawing according to the hue, transparency, etc. of the tool used at the stopped time without a need to directly configure, for instance, the hue of the tool.

According to various embodiments, the processor 120 may display information, which indicates a specific time such as a time when the tool is changed in the drawing animation that is being played back using the playback information 573, on a display (e.g., the display device 160 in FIG. 1). For example, the processor 120 may display a mark at a position corresponding to the specific time in the playback progress bar, or an icon of the tool shape. The processor 120 may configure the repeated playback section using the playback information 573, and repetitively play the configured section via the display.

According to various embodiments, the processor 120 may fetch the drawing animation stored in the animation storage 560, process the drawing animation using various modules 510, 520, 530, 540, and 550, and perform jobs that process various user inputs and events. According to an embodiment, the processor 120 may output the drawing animation to the display module 530, execute the input recognition module 520 to recognize shapes and positions of a touch and a drawing using a hand of a user or a digital pen (e.g., the digital pen 301 in FIG. 3A), execute the animation control module 550 to control the playback of the drawing animation, and execute the screen layer control module 540 to control activation/deactivation of a function relevant to a layer on the drawing animation at a specific time (e.g., a playback stop time of the drawing animation).

Figure 6:
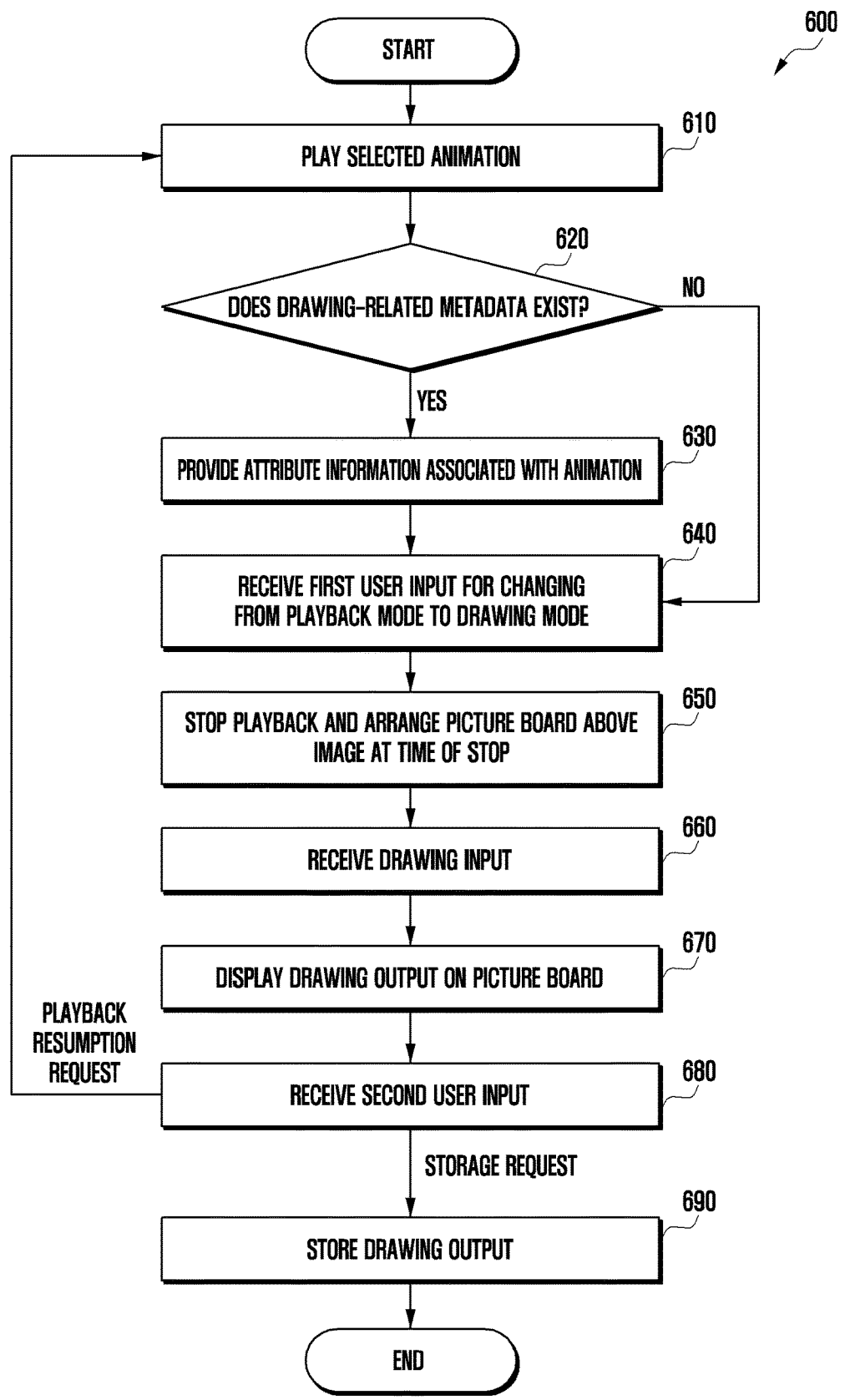
FIG. 6 illustrates operations of an electronic device according to various embodiments of the disclosure, which enable a user to make a drawing by using a sketch.

FIG. 6 illustrates operations 600 of an electronic device according to various embodiments of the disclosure, which enables a user to make a drawing by using a sketch. The operations 600 in FIG. 6 may be performed by a processor (e.g., the processor 120 in FIG. 1), and an animation executed (e.g., played back) in the following operations and used as a sketch may be received by an electronic device (e.g., the electronic device 101 in FIG. 1) from a server (e.g.,
the external electronic device 580 in FIG. 5), or be previously stored in a memory (e.g., the memory 130 in FIG. 1) of the electronic device.

According to various embodiments, in operation 610, the processor 120 may play back a selected animation via a touch sensitive display (e.g., the display device 160 in FIG. 1). According to an embodiment, the processor 120 may execute a window manager (e.g., the window manager 203 in FIG. 2) to provide a graphic user interface (GUI) (e.g., a pen up menu), which includes representative images (e.g., thumbnails) corresponding to various animations, to a user. A user may select one of the representative images (e.g., may input a touch of the corresponding image), and the processor 120 may play back the animation corresponding to the image selected by the user via the display device 160. According to an embodiment, a drawing application supporting a picture board may provide the GUI. For example, the processor 120 may execute the drawing application to display the GUI on the display device 160, and display the representative images via the GUI. According to an embodiment, the processor 120 may play back the animation, and display the playback progress bar, which enables a user to perform adjustment, stop, playback repeat, skip ahead in a preset time unit (e.g., 5 seconds, 10 seconds, 30 seconds, etc.), rewind in a preset time unit, etc. on a timeline that is being played back, via the display device 160.

According to various embodiments, in operation 620, the processor 120 may determine whether or not an animation that is being played back is a drawing animation having drawing related metadata. According to an embodiment, when the processor 120 receives the animation from a cloud system (e.g., the external electronic device 580 in FIG. 5, or the third party server) and plays back the animation via the display device 160, the processor 120 may identify the drawing related metadata received along with the animation. According to an embodiment, when the processor 120 obtains the animation from the animation storage 560 and plays back the animation via the display device 160, the processor 120 may obtain drawing related metadata associated with the animation that is being played back from the metadata storage 570.

According to various embodiments, in the case where it is determined that the animation that is being played back has the drawing related metadata, the processor 120 in operation 630 may display attribute information (e.g., attributes of the tool (e.g., a kind of tool, a hue, a line width, etc.), attribute information of the image (the object) (e.g., a hue, saturation, brightness, etc.), etc. associated with the image at a specific time (e.g., a current playback time) on the display device 160 along with the playback progress bar.

According to various embodiments, in operation 640, the processor 120 may receive a first user input for a mode change (a change from the playback mode to the drawing mode) while the drawing animation is being played back. The animation that is being played back may be the drawing animation determined as having the drawing related metadata, or an animation determined as having no drawing related metadata (e.g., an animation whose source is a camera application and which is uploaded to an external electronic device (e.g., the electronic device 104 or the server 108 in FIG. 1, or the YouTube) or an animation stored in a memory (e.g., the memory 130 in FIG. 1)). According to an embodiment, the processor 120 may receive a user touch input regarding the animation that is being played back as the first user input via a touch sensitive display (e.g., the display device 160 in FIG. 1). According to an embodiment, the processor 120 may receive a user input for playback stop as the first user input from an input device (e.g., the input device 150 in FIG. 1 or the digital pen 301 in FIG. 3A).

According to various embodiments, in operation 650, the processor 120 may stop the animation playback in response to the reception of the first user input and change the operation mode of an electronic device (e.g., the electronic device 101 in FIG. 1) to the drawing mode, thereby providing an environment in which a user may make a drawing by adopting an image at a stopped time as a sketch. According to an embodiment, the processor 120 may execute a drawing application (e.g., the screen layer control module 540 in FIG. 5) and arrange a second layer of a picture board on a first layer of the image (hereinafter referred to as "sketch") corresponding to the stopped time, thereby providing a drawing environment. According to an embodiment, the second layer may be provided as an opaque layer, and the image of the first layer may be processed (e.g., dimly processed or achromatically processed) and displayed by a processor (e.g., the animation control module 550 in FIG. 5) to be visually distinguished from an image at the time of the playback mode such that a user may intuitively recognize a current operation mode as the drawing mode. According to an embodiment, the processor 120 may configure metadata of the sketch as an attribute of the picture board (e.g., a background and/or a tool of the picture board), thereby supporting a user to be able to make a drawing in the same drawing environment as the sketch. For example, the processor 120 may confirm the metadata of the sketch at a storage (e.g., the metadata storage 570 in FIG. 5), and configure the confirmed values (e.g., a kind of drawing tool, a line width, a hue, saturation, and/or brightness) as attribute values of the tool of the picture board.

According to various embodiments, in operation 660, the processor 120 may receive a drawing input of a user from a touch sensitive display (e.g., the display device 160 in FIG. 1). For example, the user may draw a picture on the picture board provided via the display device 160 by a digital pen (e.g., the digital pen 301 in FIG. 3A) or his/her own finger, and the processor 120 may receive the drawing input of the user from the display device 160.

According to various embodiments, in operation 670, the processor 120 may display a drawing output on the picture board depending on the received drawing input. According to an embodiment, the processor 120 may confirm attributes of the sketch (e.g., a kind of tool, a line width, a hue, etc.) from the metadata, apply the confirmed attributes to the drawing output, and display the drawing output on the picture board. According to an embodiment, the processor 120 may record a process of the drawing output (e.g., a process in which the drawing input is displayed on the picture board) and the attributes applied to the drawing output, thereby additionally performing a process of making the drawing animation.

According to various embodiments, in operation 680, the processor 120 may receive a separate second user input other than the drawing input via a touch sensitive display (e.g., the display device 160 in FIG. 1) or an input device (e.g., the input device 150 in FIG. 1 or the digital pen 301 in FIG. 3A) while the operation mode of the electronic device is the drawing mode.

According to various embodiments, the processor 120 may determine that the received second user input requests playback resumption, and perform operation 610 again depending on this determination. According to an embodiment, the processor 120 may receive a user touch input regarding a playback button displayed via the playback progress bar via the display device 160, and resume animation playback from a stopped time in response to the touch input. According to an embodiment, the processor 120 may receive selection of a user for a button preset for the playback resumption via the input device, and resume the animation playback from the stopped time in response to the selection of a user. According to an embodiment, the processor 120 may receive a touch gesture (e.g., a long press) preset for the playback resumption via the display device 160, and resume the animation playback from the stopped time in response to the touch gesture.

According to various embodiments, processor 120 may determine that the second user input requests storage of the drawing output, and thus store the drawing output in a memory (e.g., the memory 130 in FIG. 1) in operation 690. For example, the second user input may be the touch input of a user for a storage button displayed via the display device 160. In operation 690, the processor 120 may additionally store the drawing animation that is made by recording the process of the drawing output and the metadata that indicates the attributes of the picture board applied to the drawing output in an animation storage (e.g., the animation storage 560 in FIG. 5) and a metadata storage (e.g., the metadata storage 570 in FIG. 5), respectively. Further, the processor 120 may transmit the drawing animation and the metadata to a cloud system (e.g., the external electronic device 580 in FIG. 5) via a communication module (e.g., the communication module 510 in FIG. 5).

According to any embodiment, the change from the playback mode to the drawing mode may be performed irrespective of the first user input. For example, the processor 120 may stop the playback at a time when the attributes of the picture board (e.g., a kind of drawing tool, a line width, a hue, etc.) are changed.

Figure 7A:
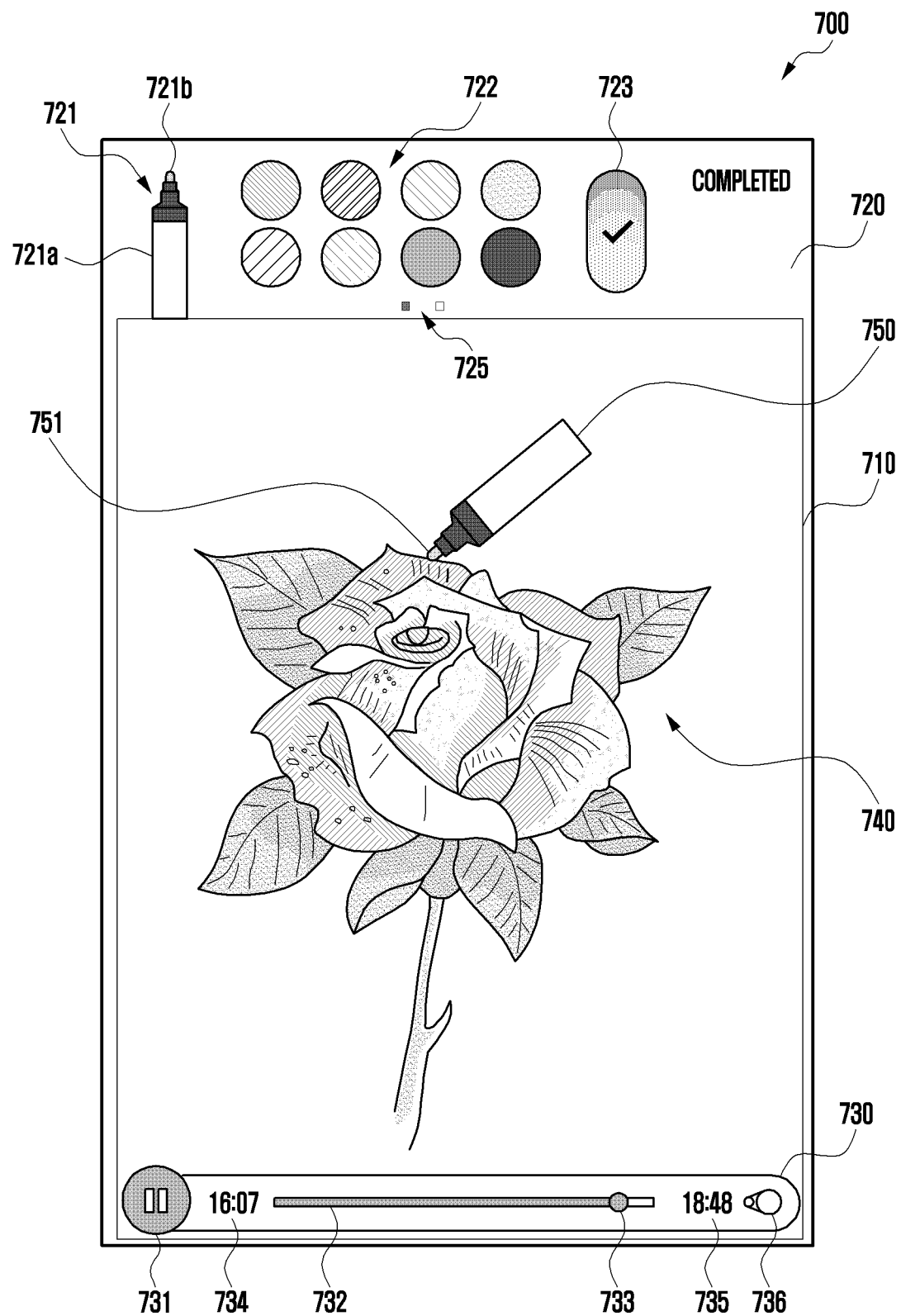
FIG. 7A and FIG. 7B illustrate a GUI supporting a playback mode in an electronic device according to various embodiments of the disclosure.
Figure 7B:
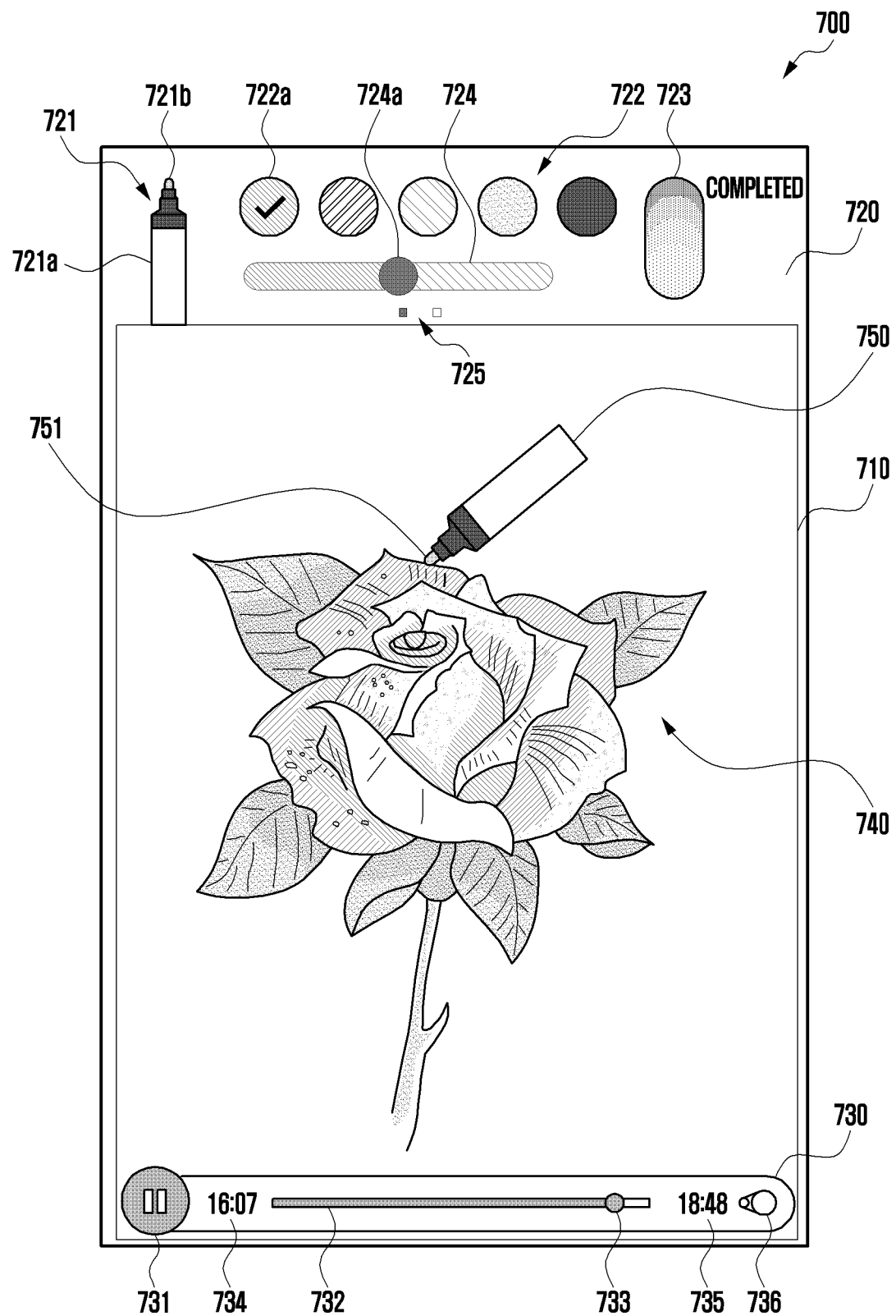
Figure 7C:
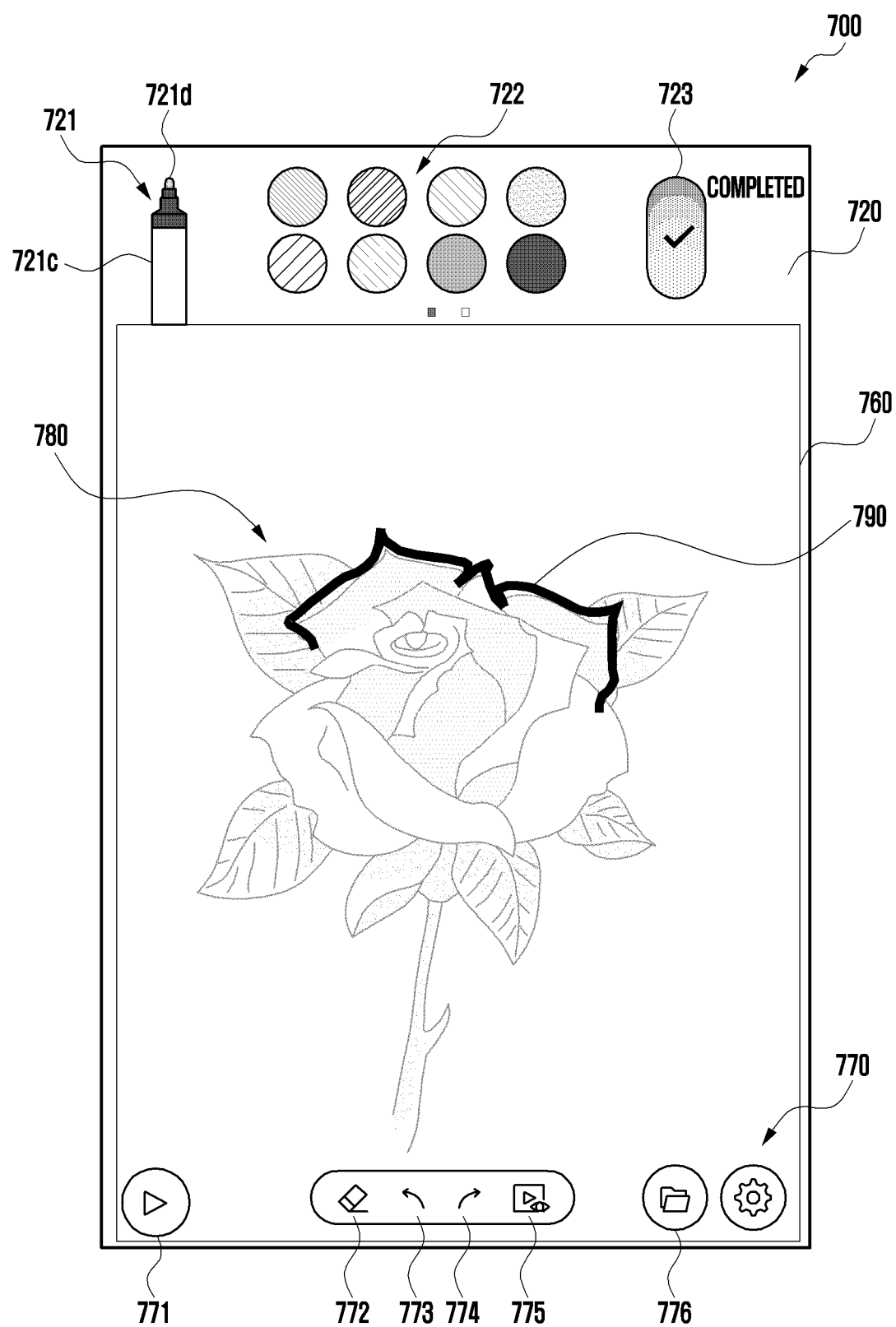
FIG. 7C illustrates a GUI supporting a drawing mode in an electronic device according to various embodiments of the disclosure.

FIGS. 7A and 7B illustrate a GUI 700 supporting a playback mode in an electronic device according to various embodiments of the disclosure, and FIG. 7C illustrates a GUI 700 supporting a drawing mode in an electronic device according to various embodiments of the disclosure.

Referring to FIGS. 7A and 7B, a processor (e.g., the processor 120 in FIG. 1) according to various embodiments may provide an animation window (in other words, a first section) 710, a palette (in other words, a second section or a picture board setup menu) 720, and a playback progress bar (in other words, a third section) 730, as a first GUI supporting a playback mode, via a touch sensitive display (e.g., the display device 160 in FIG. 1).

According to an embodiment, although not limited thereto, the palette 720 may include a tool list 721, a hue list 722, and an item (in other words, a color picker) 723 for color edition, and be displayed at an upper end of the display device 160, and the playback progress bar 730 may be displayed at a lower end of the display device 160. The animation window 710 may be located between the palette 720 and the playback progress bar 730.

According to an embodiment, a currently configured drawing tool of the picture board may be displayed on the tool list 721. For example, the drawing tool may include various tools for drawing such as an eraser, a pen, a pencil, a brush, etc., and one of them (for example, the illustrated pen) may be displayed on the tool list 721. If a user touches the tool list 721, the processor 120 may display a first pop-up window (not illustrated) that includes various tools and various line widths via the display device 160, and a tool selected from the first pop-up window by a user and a line width thereof may be displayed on the tool list 721 as a currently configured tool of the picture board. For example, a shape 721a and an end of the selected tool may be expressed as a line width 721b.

According to an embodiment, the hue list 722 may include designated colors (e.g., colors designated by a user so as to be included in the hue list 722, or colors used to make a drawing animation that is being played back at present), and a hue selected (e.g., touched) by a user among these hues may be configured as a hue (e.g., a hue of the line width 721b) of the currently configured tool. As an example, the selected hue in the hue list 722 may be processed and displayed to be visually distinguished from another hue (e.g., to make an edge thick) such that a user may intuitively recognize the selected hue as the hue of the tool. As another example, a check (I) may be displayed on the selected hue.

According to an embodiment, the hue list 722 may be edited. For example, the hue selected (e.g., long pressed) from the hue list 722 may be eliminated from the hue list 722. If a user touches the item 723, the processor 120 may display a second pop-up window (not illustrated) that includes a color spectrum for adjusting attributes of the hue such as saturation, brightness, etc. along with various hues, and a hue selected from the second pop-up window by a user may be added to the hue list 722. Further, the attributes (e.g., saturation and/or brightness) selected from the color spectrum may be configured in the hue list 722 as attributes of the corresponding hue.

According to an embodiment, a bar for adjusting the attributes (e.g., saturation and/or brightness) of the selected hue may be displayed on the palette 720. Referring to FIG. 7B, the processor 120 may display the check (√) on the selected hue 722a, and display a brightness adjustment bar 724 of the selected hue on the palette 720. The processor 120 may display a mark 724a on the brightness adjustment bar 724, adjust a position of the mark 724a in response to the touch input of a user for the mark 724a, and configure a value of designated brightness corresponding to the position of the mark 724a as brightness of the hue 722a displayed by the check (√). Although not illustrated, a saturation adjustment bar and/or a transparency adjustment bar may be included in and displayed on the palette 720.

According to an embodiment, the hue list 722 may be divided into various pages, one of which may be displayed via the palette 720. For example, the processor 120 may display one of the various pages on the palette 720. The processor 120 may display an indicator 725, which indicates the number of whole pages and a position of the displayed page, on the palette 720. The processor 120 may display another page on the palette 720 in response to the touch input of a user (e.g., a flick or a drag) in the palette 720.

According to an embodiment, the hue of the currently configured tool may be configured via a first item 723. For example, if a user touches the first item 723, the processor 120 may display a second pop-up window. A hue selected from the second pop-up window by a user may be designated as the hue of the currently configured tool, and the attribute (e.g., saturation and/or brightness) selected from the color spectrum may be designated as an attribute of the designated hue.

According to an embodiment, the playback progress bar 730 may include a pause button 731, a time line 732, a mark 733 indicating a current playback time in the time line 732, a playback time 734, a whole playback time 735, and a second item 736 for adjusting a playback rate and an exposure level (in other words, transparency) of the animation. For example, if a user touches the second item 736, the processor 120 may display a third pop-up window (not illustrated) that includes variable rate icons for adjusting the playback rate of the animation stage by stage (e.g., ½× rate, 1× rate, 2× rate, 4× rate, etc.) and transparency icons for adjusting the transparency of the animation stage by stage (e.g., 0%, 50%, 100%, etc.), and the animation having the transparency selected from the third pop-up window may be played back via the window 710 at the rate selected from the third pop-up window.

According to various embodiments, the processor 120 may play back the selected animation (e.g., the animation selected via operation 610) via the window 710.

According to various embodiments, the processor 120 may confirm metadata, which corresponds to an image 740 at a current playback time (e.g., the playback time 734) in the animation that is being played back via the window 710, in a storage (e.g., the metadata storage 570 in FIG. 5), and display information indicating the confirmed metadata via the window 710.

According to an embodiment, the processor 120 may display a motion of a tool 750, which draws an object when the drawing animation is played back, on the display device 160, thereby supporting a user to be able to intuitively recognize a process in which the drawing animation is made (e.g., by which tool and method an expert draws a picture).

According to an embodiment, the processor 120 may display attributes of the tool 750 (e.g., a kind of tool, a line width, a hue of the line, etc.) via the window 710. For example, the processor 120 may display the tool 750 in a shape showing the corresponding kind, and display an end 751 of the tool 750 (e.g., a line width) with the corresponding hue.

According to an embodiment, the processor 120 may display attributes of the tool (e.g., a kind of tool, a size, a hue, etc.) used at a current playback time via the palette 720. For example, the processor 120 may represent a shape (e.g., the shape 721a) showing the kind of the tool used at a current playback time via the tool list 721, and its line width (e.g., the line width 721b). The processor 120 may represent a hue used at a current playback time via the hue list 722 or the first item 723. Referring to FIG. 7B, in the case where the hue used at a current playback time is present in the hue list 722, the processor 120 may display a check (√) on the corresponding hue 722a in the hue list 722. Referring to FIG. 7A, in the case where the hue used at a current playback time is not present in the hue list 722, the processor 120 may display a check (√) on the first item 723. If the first item 723 displayed by the check (√) is touched, the processor may display the second pop-up window, and display a check (√) on the hue used at a current playback time in the hue list of the second pop-up window.

According to various embodiments of the disclosure, if a user presses the pause button 731 with the digital pen or the hand or gives a touch (e.g., touching the image 740 within the window 710) to the animation window 710, the processor 120 may stop the animation playback, and change the operation mode of the electronic device 101 from a playback mode to a drawing mode. Especially, the electronic device 101 may provide an environment, which may start a drawing at the touched point in the animation window 710, to a user.

Referring to FIG. 7C, according to various embodiments, a processor (e.g., the processor 120 in FIG. 1) may provide a picture board (in other words, a first section) 760, a palette (in other words, a second section) 720, and a drawing control menu (in other words, a third section) 770, as a second GUI supporting the drawing mode, via a touch sensitive display (e.g., the display device 160 in FIG. 1).

According to various embodiments, the palette 720 may be disposed at an upper end of the display device 160 in the same configuration as when the electronic device 101 is operated in the playback mode. The drawing control menu 770 may be disposed at a lower end of the display device 160 in place of the playback progress bar 730. The picture board 760 may be disposed between the palette 720 and the drawing control menu 770. According to an embodiment, the drawing control menu 770 may include a button 771 for playback resumption, an eraser 772 acting as a tool for erasing a drawing output 790 drawn on the picture board 760, a button 773 for eliminating the drawing output 790 drawn on the picture board 760, an replay button 774 for replaying the eliminated drawing output 790, an exposure on/off button 775 for selecting whether to expose a sketch, and a button 776 for enabling a user to select another animation to be used as the sketch. According to an embodiment, the processor 120 may display an image 780 at a stopped time between the palette 720 and the drawing control menu 770 and arrange the picture board 760 on the image 780, thereby providing an environment in which a picture can be drawn by using the image 780 as a sketch.

According to various embodiments, the image (sketch) 780 may be imaged by a processor (e.g., the animation control module 550 in FIG. 5) such that a user may intuitively recognize a mode change and facilitate making a drawing along the sketch 780 because a drawing line of the sketch 780 is made highly visible. For example, if the animation playback is stopped, the processor 120 may dimly process and/or achromatically process the image at a stopped time to generate the sketch 780, and display the sketch 780 via the display device 160. According to an embodiment, processor 120 may display the sketch 780 in response to a touch input for the exposure on/off button 775, or terminate the display of the sketch 780. Accordingly, a user may compare his/her drawing output 790 in a state in which the sketch 780 is excluded with the drawing output 790 in a state in which the same overlaps the sketch 780, and check his/her own drawing level via the repeated comparison. According to an embodiment, the processor 120 may remove the drawing output 790 in response to a user input for the elimination button 773, and replay the drawing output 790 to display it on the picture board 760 in response to a user input for the replay button 774.

According to various embodiments, the processor 120 may confirm metadata (e.g., a kind of tool, a line width, a hue, saturation, and/or brightness) corresponding to the sketch 780 in a storage (e.g., the metadata storage 570 in FIG. 5) so as to enable a user to make a drawing in the same drawing environment as the sketch 780, and configure the confirmed metadata as attributes of the picture board 760.

According to various embodiments, the processor 120 may display attributes of the sketch 780 via the display device 160 so as to enable a user to intuitively recognize the attributes of the sketch 780. According to an embodiment, the processor 120 may display attributes of the tool (e.g., a kind of tool, a size, a hue, saturation, and/or brightness) used at a stop time via the palette 720. For example, the processor 120 may represent a kind 721c of the tool used at a stop time via the tool list 721, and its line width 721d. The processor 120 may represent a hue used at a stop time via the hue list 722 or the first item 723. For example, in the case where the hue used at a stop time is present in the hue list 722, the processor 120 may display a check (√) on the corresponding hue in the hue list 722. As another example, as illustrated in FIG. 7C, in the case where the hue used at a stop time is not present in the hue list 722, the processor 120 may display a check (√) on the first item 723.

According to various embodiments, the processor 120 may provide an environment that may make a drawing by adopting an animation played back in real time as a sketch. According to an embodiment, if a user touches the picture board 760 while animation playback has stopped (e.g., touches the image 780 displayed on the picture board 760, or touches an area of the picture board 760, in which no image 780 is displayed), the processor 120 may resume the animation playback and may display the user's drawing output on the picture board 760. In the case where the user's drawing input is stopped on the picture board 760 and is released from the picture board 760, the processor 120 may stop the animation playback.

FIGS. 8A, 8B, 8C, and 8D illustrate a GUI 800 providing an animation divided into various steps in an electronic device according to various embodiments of the disclosure. An animation that is provided to a user via the GUI and is used as a sketch may be received by an electronic device (e.g., the electronic device 101 in FIG. 1) from a server (e.g., the external electronic device 580 in FIG. 5) along with the corresponding metadata, or be previously stored in a memory (e.g., the memory 130 in FIG. 1) of the electronic device along with the corresponding metadata.

According to various embodiments, a processor (the processor 120 in FIG. 1) may divide the animation into various steps (in other words, an animation piece, a playback section, or an animation) on the basis of a designated reference. Accordingly, a user may more easily draw a complicated picture having lots of attribute changes. According to an embodiment, the processor 120 may divide a whole playback section of the animation into various steps using a position (i.e., a playback time) selected by a user as a first reference. According to an embodiment, the processor 120 may divide the whole playback section of the animation into the various steps by using the time when attributes of the tool (e.g., a kind of tool, a size, a hue, etc.) used during the drawing are changed as the second reference. According to an embodiment, processor 120 may divide the whole playback section of the animation into the various steps by using an object (e.g., a petal, a leaf, a branch, etc.) as a third reference. For example, the processor 120 may confirm a change time of the object (e.g., a time when a drawing of first portion (e.g., a petal) of the object is completed and a drawing of a second portion (e.g., a branch) is started) from metadata of the animation, and designate this as the third reference. According to an embodiment, the processor 120 may divide the animation into various steps by using a designated time (e.g., in units of several seconds) as a fourth reference. According to an embodiment, the animation may be divided into various steps on the basis of at least one or more of the first to fourth references.

Figure 8A:
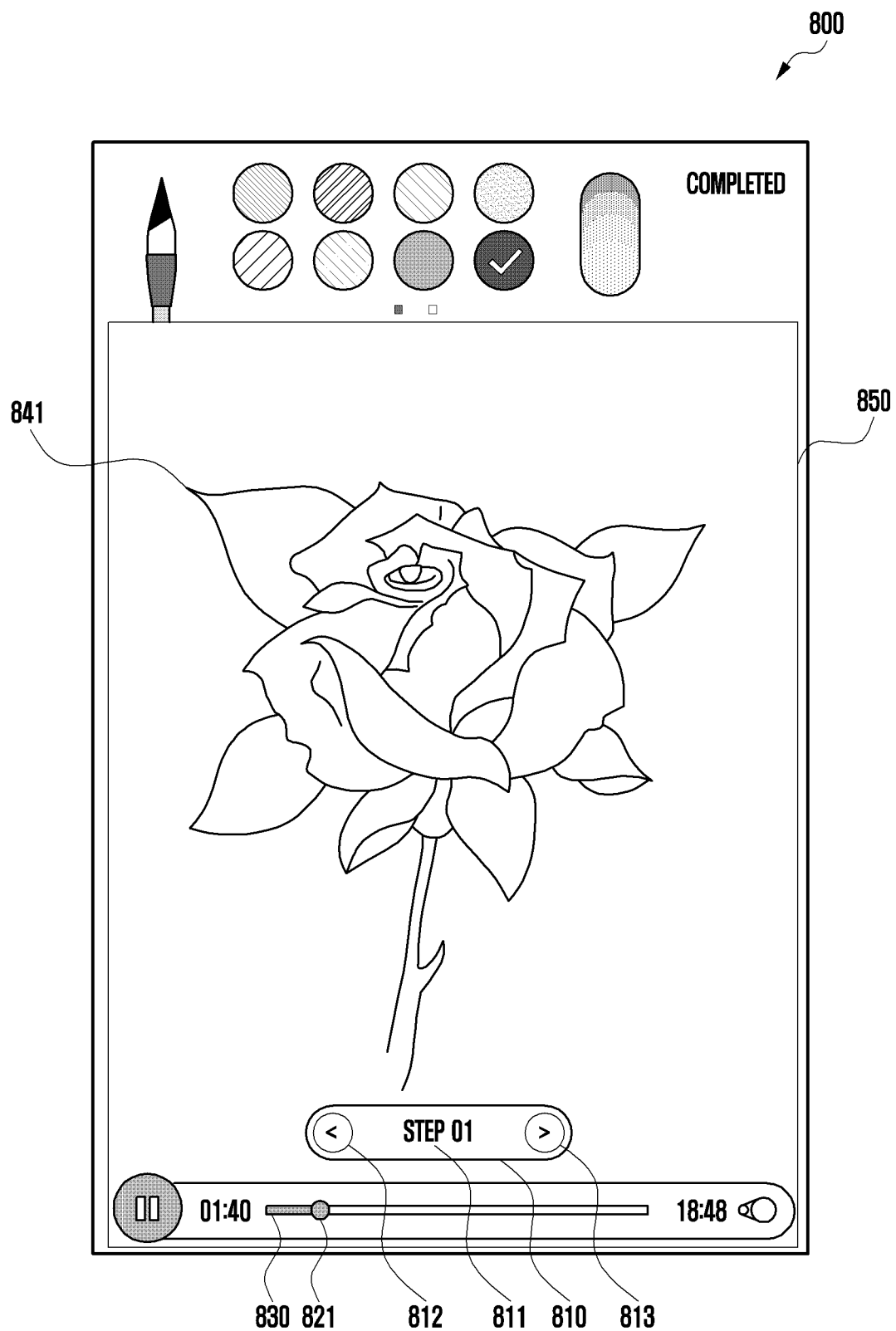
FIG. 8A, FIG. 8B, FIG. 8C, and FIG. 8D illustrate a GUI for dividing an animation into multiple steps and providing the same in connection with an electronic device according to various embodiments of the disclosure.
Figure 8B:
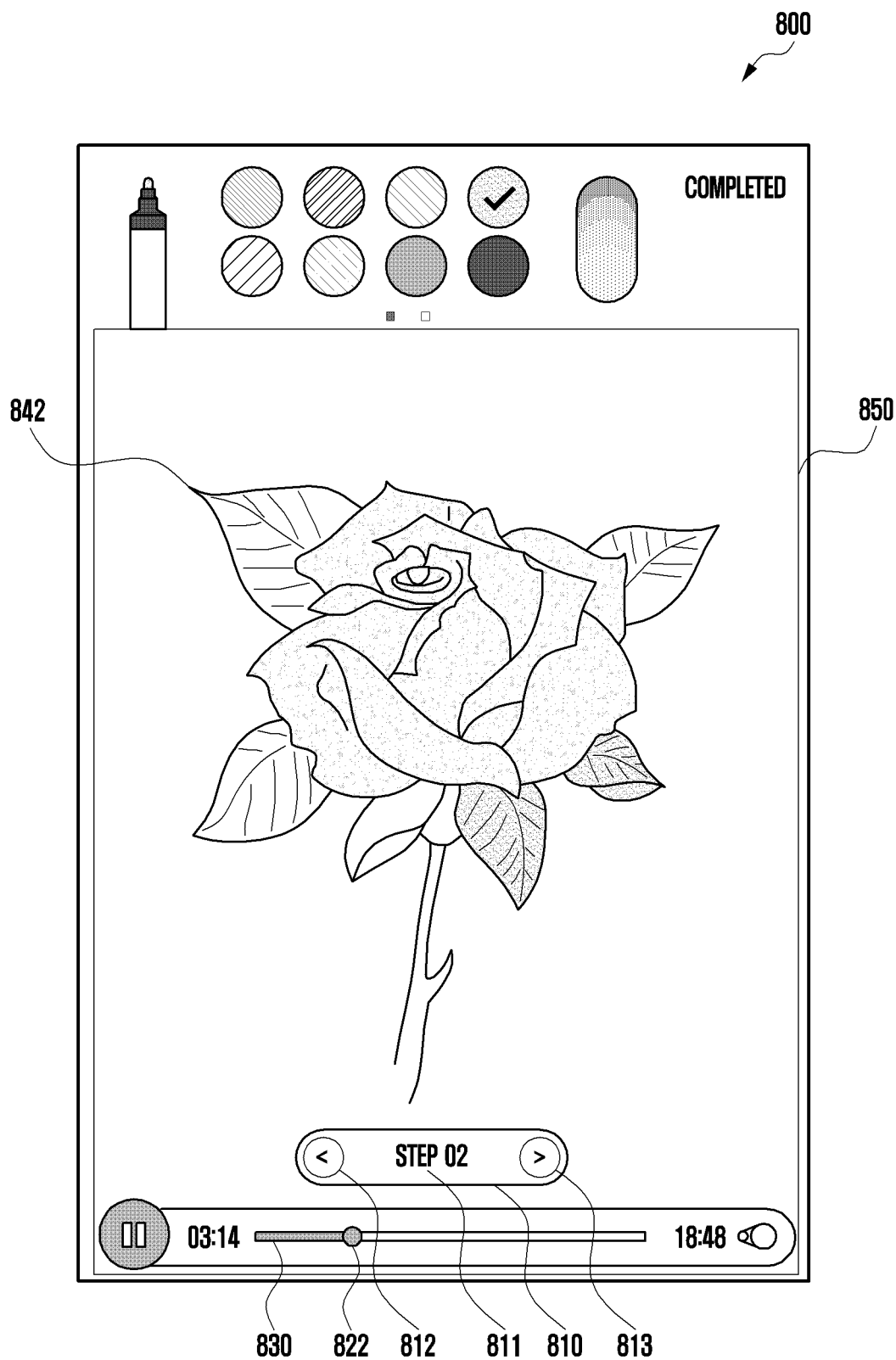
Figure 8C:
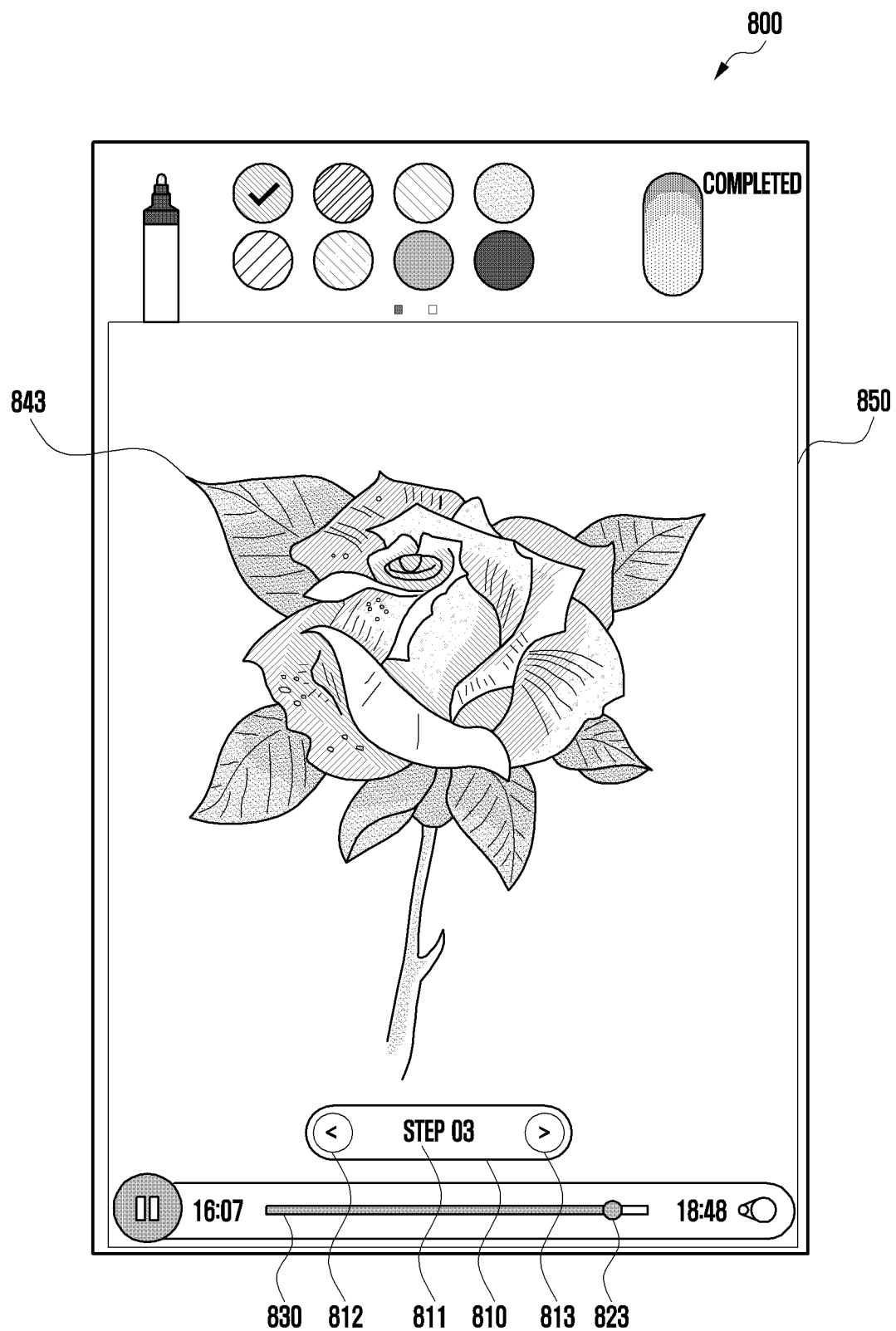

According to various embodiments, when the animation divided into various steps on the basis of the designated reference is played back, a processor (the processor 120 in FIG. 1) may change a playback time in response to a user input. According to an embodiment, as illustrated in FIG. 8A, the processor 120 may provide a UI 810 for changing the playback time at a lower end of a screen. The UI 810 may include an indicator 811 on which "STEP 01" is displayed as a current playback section, a first icon 812 for moving the playback section to a previous step, and a second icon 813 for moving the playback section to the next step. The processor 120 may display a first mark 821 indicating a current playback time in STEP 01 on a time line 830 indicating a whole playback section, and display a first image 841 of the animation corresponding to the current playback time via a window 850. If a user touches the second icon 813, the processor 120 may display "STEP 02" as the next step via the indicator 811 as illustrated in FIG. 8B, display a second mark 822 indicating a current playback time (e.g., a start time of STEP 02) in STEP 02 on the time line 830, and display a second image 842 of the animation corresponding to the current playback time via the window 850. If a user again touches the second icon 813, the processor 120 may display "STEP 03" as the next step via the indicator 811 as illustrated in FIG. 8C, display a third mark 823 indicating a current playback time (e.g., a start time of STEP 03) in STEP 03 on the time line 830, and display a third image 843 of the animation corresponding to the current playback time via the window 850.

Figure 8D:
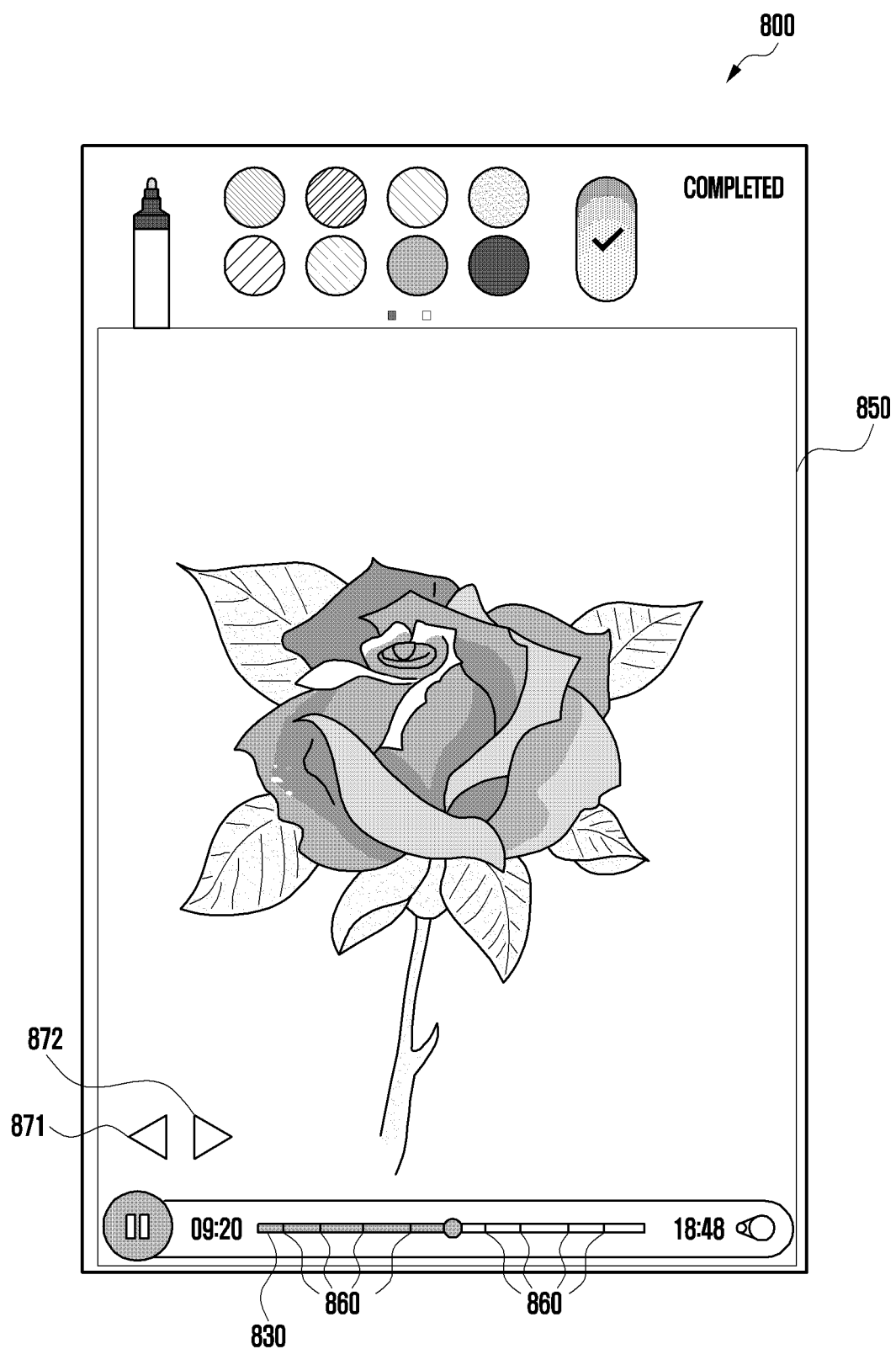

According to various embodiments, a processor (the processor 120 in FIG. 1) may provide visual information, which makes it possible for a user to intuitively recognize various steps of the animation, via the display 160. According to an embodiment, as illustrated in FIG. 8D, the processor 120 may display marks 860 indicating each step (e.g., a start time of each step) on the time line 830. According to an embodiment, the processor 120 may display a first icon 871 for moving the playback section to the previous step, and a second icon 872 for moving the playback section to the next step via the display 160 along with the marks 860.

According to various embodiments, a processor (the processor 120 in FIG. 1) may play back the animation via the window 850, and stop the animation playback on the basis of the designated reference (e.g., at least one of the first to fourth references).

According to various embodiments, a processor (the processor 120 in FIG. 1) may stop the animation playback on the basis of the designated reference, and provide a GUI (e.g., the second GUI in FIG. 7C) supporting the drawing mode via the display device 160.

Figure 9A:
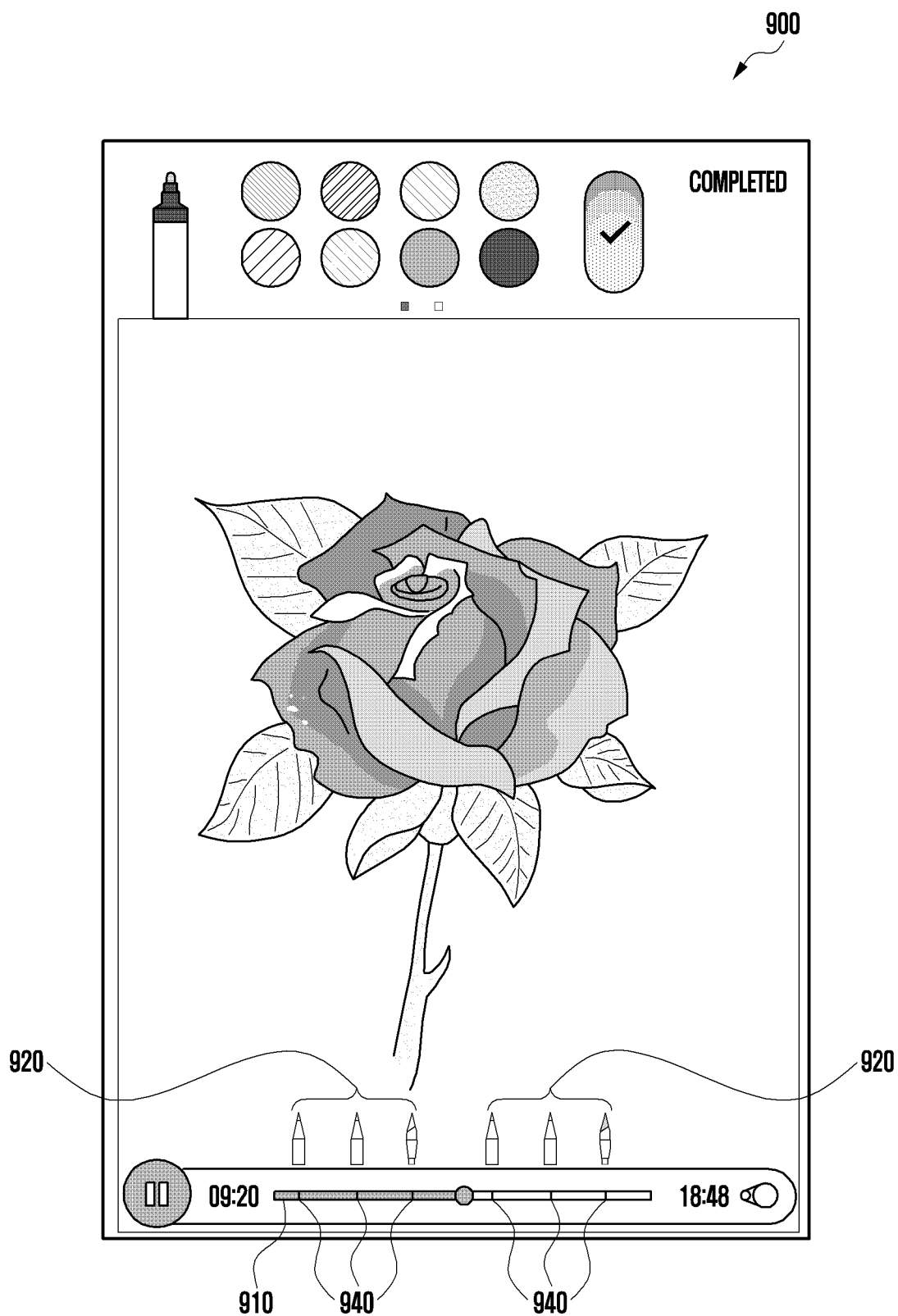
FIG. 9A and FIG. 9B illustrate a GUI providing metadata related to an animation in connection with an electronic device according to various embodiments of the disclosure.
Figure 9B:
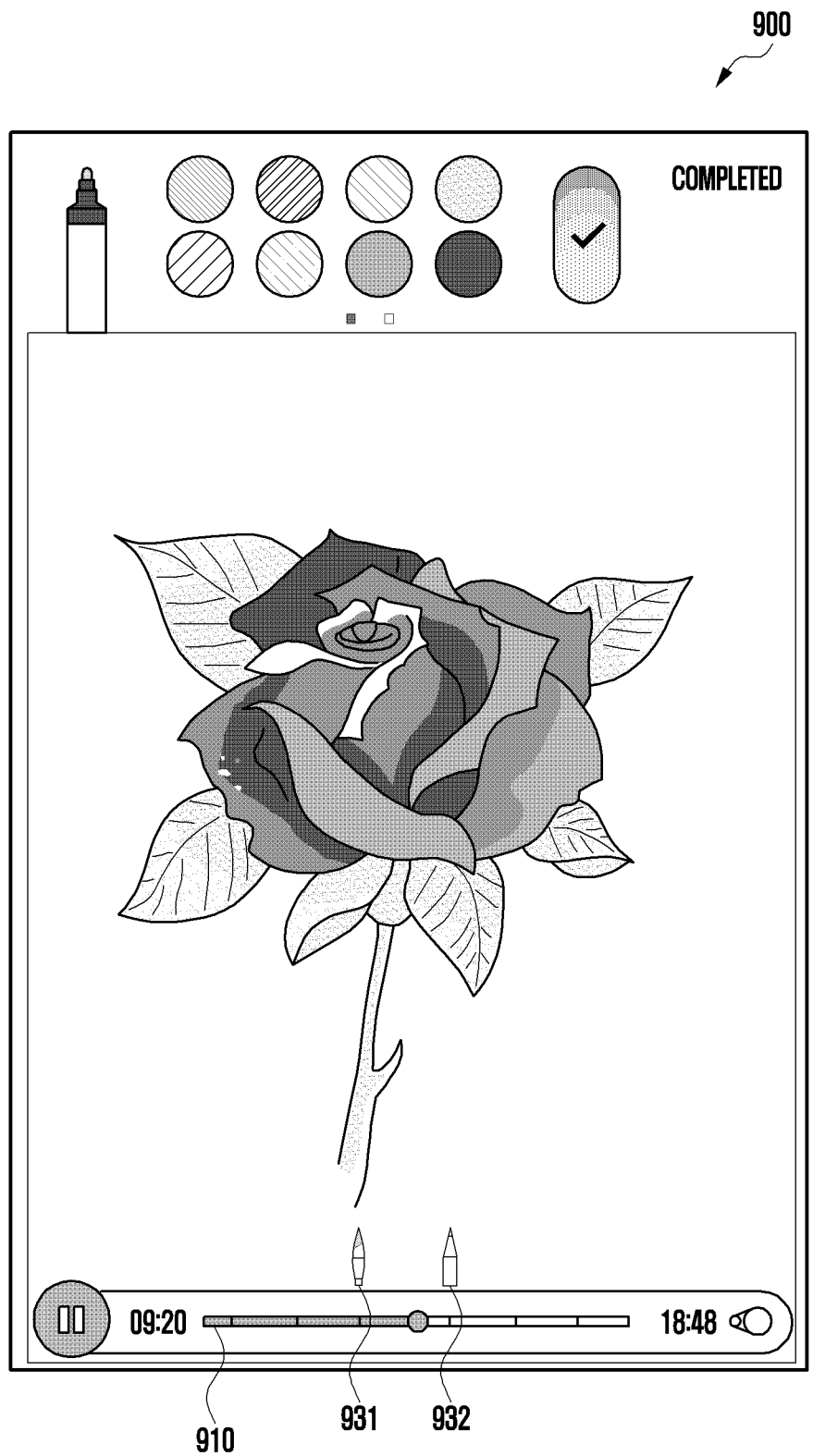

FIGS. 9A and 9B illustrate a GUI 900 providing metadata related to an animation in an electronic device according to various embodiments of the disclosure. An animation that is provided to a user via the GUI and is used as a sketch may be received by an electronic device (e.g., the electronic device 101 in FIG. 1) from a server (e.g., the external electronic device 580 in FIG. 5) along with the corresponding metadata, or be previously stored in a memory (e.g., the memory 130 in FIG. 1) of the electronic device along with the corresponding metadata.

According to various embodiments, a processor (e.g., the processor 120 in FIG. 1) may provide visual information, which makes it possible for a user to intuitively recognize metadata of the animation that is being played back, via a display 160. According to an embodiment, as illustrated in FIG. 9A, the processor 120 may display marks 940 indicating a start time of each step in connection with the animation divided into various steps on the basis of the designated reference (e.g., at least one of the first to fourth references) on a time line 910, and display images 920, which indicate attributes of the tool (e.g., a kind of tool, a size, a hue, etc.) used in each step, around the corresponding marks. If one of the images 920 is touched, the processor 120 may perform the animation playback from a start time of the step corresponding to the touched image. According to an embodiment, as illustrated in FIG. 9B, a first image 931 corresponding to the previous step and a second image 932 corresponding to the next step on the basis of a current playback time due to a space limitation of the time line 910 may be displayed around the corresponding marks by the processor 120.

According to various embodiments, a processor (e.g., the processor 120 in FIG. 1) may provide the user with the level of difficulty in making a drawing animation, thereby providing a drawing environment in which the user can draw a picture according to his/her drawing skills. According to an embodiment, the processor 120 may receive metadata including information indicting the level of difficulty of making the animation, together with the animation, from a cloud system (e.g., the external electronic device 580 in FIG. 5) via a communication module (e.g., the communication module 510 in FIG. 5). The processor 120 may execute a window manager (e.g., the window manager 203 in FIG. 2), thereby providing, via a display device 160, a GUI including an indicator (not illustrated) indicating the level of difficulty in making each animation, together with representative images (e.g., thumbnails) corresponding to respective animations. The indicator may indicate the level of difficulty of the corresponding animation by using a marking "high", "intermediate", or "low", for example, such that the user can select an animation matching with his/her drawing skills from the animation list. The processor 120 may play the selected animation via a window (e.g., the window 710 in FIG. 7A).

According to various embodiments, a processor (e.g., the processor 120 in FIG. 1) may determine, based on metadata, the level of difficulty in making the corresponding animation, and may store the result of determination in a storage (e.g., the metadata storage 570 in FIG. 5) as additional metadata of the corresponding animation. According to an embodiment, the processor 120 may determine level of difficulty in making the corresponding animation with reference to metadata of the corresponding animation, such as the type of the used tool, the number of times the tool is used, the number of used hues, the entire playback time, and the number of times the tool is changed. For example, the processor 120 may determine that a watercolor brush, an oil paint brush, or the like is a tool that is difficult handle and, if such a tool is included as metadata of the corresponding animation, may confirm that the level of difficulty of the corresponding animation is high. According to an embodiment, the processor 120 may determine the level of difficulty in making the corresponding animation by using an artificial intelligence algorithm. For example, the artificial intelligence algorithm may be learned through deep leaning, and may include a visual understanding technology for recognizing entities (e.g., objects as components of an animation), an inference/prediction technology for determining information and logically inferring and predicting the same, and the like.

According to various embodiments, the processor (e.g., the processor 120 in FIG. 1) may, during a drawing mode, perform an operation of repeatedly playing a designated section of an animation (e.g., at least one of multiple steps distinguished based on at least one of the first to fourth references, or a section designated by the user). As a result of performing the operation of repeatedly playing a section, the user can copy and draw a complicated picture that undergoes frequent attribute changes, for example, more easily. According to an embodiment, if the user stops the animation playback, the processor 120 may provide a GUI (for example, the second GUI in FIG. 7C), as a drawing environment, through the display 160. In response to receiving a user input for repeated section playback, the processor 120 may identify a step (playback section) including the time of stop, and may repeatedly play the same as a sketch of the picture board from the starting time to the ending time of the identified playback section. The processor 120 may stop the repeated section playback after performing the same a predetermined number of times, or in response to receiving a user input (e.g., a touch input). According to another embodiment, the processor 120 may perform a repeated playback from the time of stop to the ending time of the corresponding section. According to still another embodiment, the processor 120 may dynamically change the repeated playback section based on the user's drawing input. For example, the processor 120 may configure the time of stop as a first starting time for a repeated playback, may configure the section from the configured first starting time to the ending time of the corresponding section as a first playback section, and may repeatedly play the first playback section. While the first playback section is played, the processor 120 may receive the user's drawing input, and may output a drawing output following the drawing input on the picture board. Concurrently with displaying the drawing output on the picture board, the processor 120 may configure a second starting time, based on the drawing input. For example, the processor 120 may play a process in which a sketch is drawn from the first starting time to the ending time of the corresponding section via the display. In connection with the sketch played via the display, the processor 120 may recognize an area corresponding to the touch position of the drawing input, may specify the time at which the area was drawn (e.g., a time between the first starting time and the current playback time, or the current playback time); and may configure the specific time as a second starting time. The processor 120 may configure a section from the configured second starting time to the ending time of the corresponding section as a second playback section, and may repeatedly play the second playback section.

Figure 10:
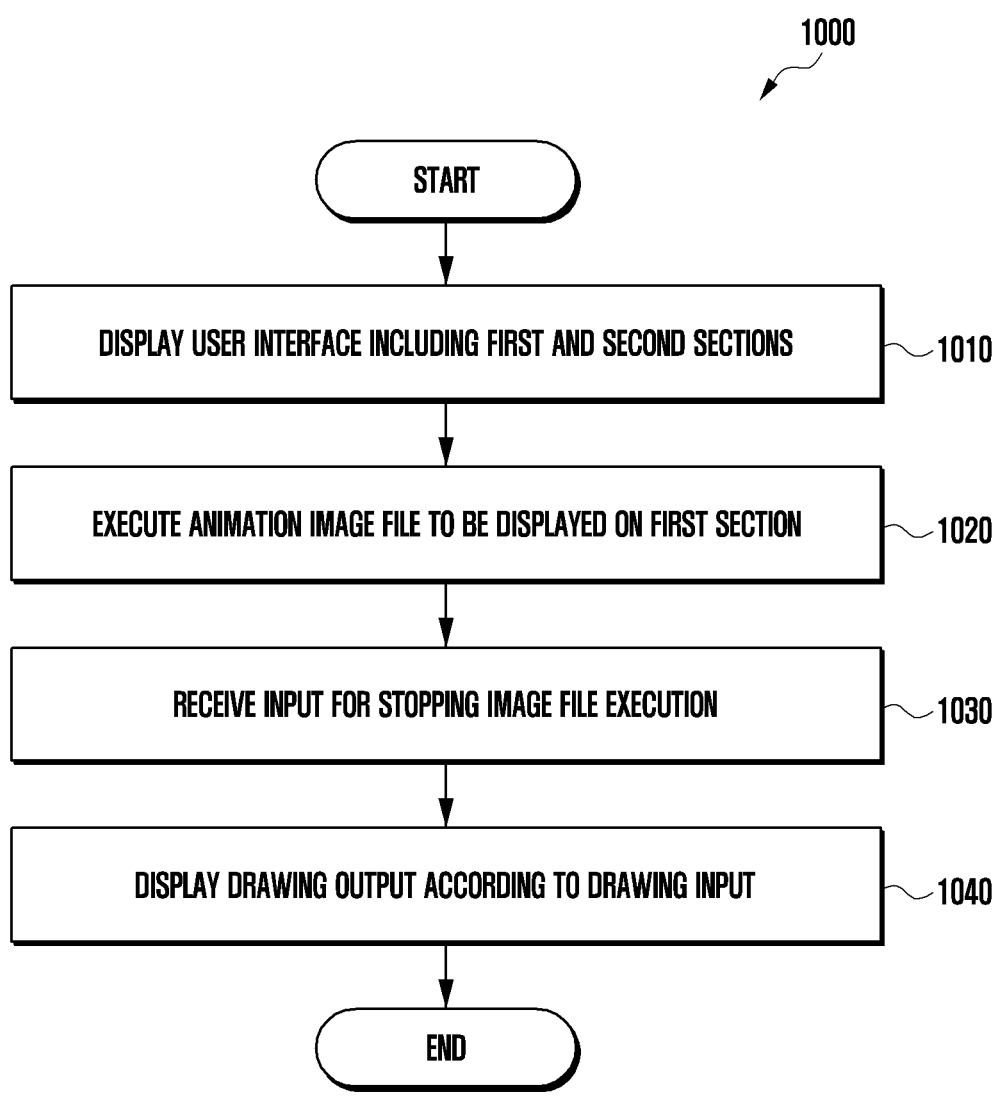
FIG. 10 illustrates operations of an electronic device according to various embodiments of the disclosure.

FIG. 10 illustrates operations 1000 of an electronic device according to various embodiments of the disclosure. The operations 1000 may be performed by a processor (e.g., the processor 120 in FIG. 1), and an animation executed (e.g., played) during the following operations and used as a sketch may be received by the electronic device (e.g., the electronic device 101 in FIG. 1) from a server (e.g., the external electronic device 580 in FIG. 5) or may be prestored in a memory (e.g., the memory 130 in FIG. 1) of the electronic device.

According to various embodiments, in operation 1010, the processor 120 may display, on the display device 160, a user interface including a first section (e.g., the first section 710 in FIG. 7A) configured to receive a drawing input and a second section (for example, the second section 720 in FIG. 7A) including multiple hues and one or more line widths to be selected for the drawing input.

According to various embodiments, in operation 1020, the processor 120 may execute (e.g., play) an animation image file (e.g., an animation received from the external electronic device 580 in FIG. 5, or an animation stored in the memory 130 in FIG. 1) including an order in which an object is drawn by using at least one of the multiple hues and at least one of the one or more line widths.

According to various embodiments, in operation 1030, the processor 120 may receive an input for stopping execution of the image file (e.g., a touch input regarding the pause button 731 in FIG. 7A).

According to various embodiments, in operation 1040, the processor 120 may display, on the display device 160, a drawing output including at least one among at least one hue and at least one line width used when the drawing input is received, according to the drawing input.

An electronic device according to various embodiments may include: a touchscreen display (e.g., the display device 160 in FIG. 1); a processor (e.g., the processor 120 in FIG. 1) operatively connected to the display; and a memory (e.g., the memory 130 in FIG. 1) operatively connected to the processor. The memory may include instructions that, when executed, cause the processor to: display, on the display, a user interface including a first section (e.g., the first section 710 in FIG. 7A) configured to receive a drawing input and a second section (e.g., the second section 720 in FIG. 7A) including multiple hues and one or more line widths to be selected for the drawing input; execute an animation image file to be displayed on the first section, the animation image file including an order in which an object is drawn by using at least one hue among the multiple hues and at least one line width among the one or more line widths; receive an input for stopping executing the image file from the display; and display a drawing output on the display according to the drawing input, the drawing output including at least one of a hue and a line width used when the drawing input is received.

According to various embodiments, the instructions may be configured to cause the processor to receive a drawing input by an external stylus pen (e.g., the digital pen 301 in FIG. 3A) from the display.

According to various embodiments, the instructions may be configured to cause the processor to: execute the image file so as to display a first animation of drawing a first part of the object by using a first hue and a first line width for a first duration period (e.g., STEP 01 in FIG. 8A); receive a first input for stopping execution of the image file for the first duration period; and display a drawing output for including the first hue and the first line width.

According to various embodiments, the instructions may be configured to cause the processor to: execute the image file so as to display a second animation of drawing a second part of the object by using a second hue and a second line width for a second duration period (e.g., STEP 02 in FIG. 8B) after the first duration period; receive a second input for stopping execution of the image file for the second duration period; and display a drawing output for including the second hue and the second line width.

According to various embodiments, the instructions may be configured to cause the processor to: stop the playback, based on receiving an input (e.g., a touch input regarding the pause button 731 in FIG. 7A) for stopping playback of the image file through the display, and display the first section on the display, the first section including an image (e.g., the image 780 in FIG. 7C) at a time at which the playback is stopped and a picture board (e.g., the picture board 760 in FIG. 7C) arranged above the image and configured to receive a drawing input. The instructions may be configured to cause the processor to: acquire attribute information related to a drawing tool of the image from metadata associated with the image at the time at which the playback is stopped; and display a drawing output (e.g., the drawing output 790 in FIG. 7C), to which the acquired attribute information is applied, on the picture board. The attribute information may include at least one of the type of the drawing tool, the width of a line drawn on the picture board by the tool, the hue of the line, the brightness of the line, and the saturation of the line. The instructions may be configured to cause the processor to: process (e.g., apply dimming processing and/or achromatic processing to) the image at the time at which the playback is stopped so as to be visually distinguished from an image displayed on the picture board when the image file is played, and display the image at the time at which the playback is stopped on the picture board.

According to various embodiments, the instructions maybe configured to cause the processor to display, on the second section (e.g., the palette 720 in FIG. 7A), metadata associated with an image at a current playback time in the image file. The metadata may include information (e.g., the tool list 721 in FIG. 7A) indicating the type of a drawing tool and information (e.g., the hue list 722 in FIG. 7A) indicating the hue of the image.

According to various embodiments, the instructions may be configured to cause the processor to display, on the display, the user interface further including a third section (e.g., the playback progress bar 730 in FIG. 7A). The third section may include a button for stopping playback of the image file, a timeline indicating the entire playback section of the image file, and a button for selecting whether or not to expose the image file. The instructions may be configured to cause the processor to divide, based on a designated reference, the entire playback section of the image file into multiple playback sections, and perform playback from a starting time of one of the playback sections, in response to a user input. The designated reference may include at least one of a playback time (e.g., the first reference) selected by the user, a playback time (e.g., the second reference) at which the attribute of the drawing tool is changed, a time (e.g., the third reference) at which drawing of each part of the object starts, and a designated time unit (e.g., the fourth reference). The instructions may be configured to cause the processor to display marks (e.g., the marks 860 in FIG. 8D) for identifying the playback sections on the timeline. The instructions may be configured to cause the processor to display, on the display, a drawing tool (e.g., the images 920 in FIG. 9A or the images 931 and 932 in FIG. 9B) corresponding to at least one of the marks. The instructions may be configured to cause the processor to repeatedly play at least a part of one of the playback sections a predetermined number of times or until a designated user input is received. The instructions may be configured to cause the processor to display, in the third section, a playback button (e.g., the button 771 in FIG. 7C), a button for canceling the drawing output (e.g., the button 773 in FIG. 7C), and a button (e.g., the button 775 in FIG. 7C) for displaying again the drawing output, instead of the stop button and the timeline, if playback of the image file is stopped.

According to various embodiments, the instructions may be configured to cause the processor to display, in the first section, the movement of a tool for drawing the object while playing the image file.

According to various embodiments, the instructions may be configured to cause the processor to display a hue used at a time at which the image file is played, among multiple hues displayed in the second section, so as to be distinguished from other hues.

A method for operating an electronic device according to various embodiments may include the operations of: displaying, on a touchscreen display, a user interface including a first section configured to receive a drawing input and a second section including multiple hues and one or more line widths to be selected for the drawing input; executing an animation image file to be displayed on the first section, the animation image file including an order in which an object is drawn by using at least one hue among the multiple hues and at least one line width among the one or more line widths; receiving an input for stopping executing the image file from the display; and displaying a drawing output on the display according to the drawing input, the drawing output including at least one of a hue and a line width used when the drawing input is received.

The method according to various embodiments may further include an operation of receiving a drawing input by a stylus pen from the display.

Embodiments of the disclosure provided in this specification and the drawings are only specific examples presented to easily describe technical content according to embodiments of the disclosure and to help understanding of embodiments of the disclosure, without limiting the scope of embodiments of the disclosure. Therefore, the scope of various embodiments of the disclosure is to be interpreted as encompassing all changes or modified forms derived based on the technical idea of various embodiments of the disclosure, in addition to the embodiments disclosed herein.

The invention claimed is:

1. An electronic device comprising:
a touchscreen display;
a processor operatively connected to the display; and
a memory operatively connected to the processor, wherein the memory comprises instructions that, when executed, cause the processor to:
display, on the display, a user interface comprising a first section configured to receive a drawing input and a second section comprising multiple hues and one or more line widths to be selected for the drawing input;
execute an animation image file to be displayed on the first section, the animation image file comprising an order in which an object is drawn by using at least one hue among the multiple hues and at least one line width among the one or more line widths;
receive an input for stopping executing the image file from the display; and
display a drawing output on the display according to the drawing input, the drawing output comprising a hue and a line width used when the drawing input is received,
wherein the instructions are configured to cause the processor to display, on the second section, metadata associated with an image at a current playback time in the image file, and
wherein the metadata comprises information indicating a type of a drawing tool and information indicating a hue of the image.

2. The electronic device of claim 1, wherein the instructions are configured to cause the processor to:
execute the image file so as to display a first animation of drawing a first part of the object by using a first hue and a first line width for a first duration period;
receive a first input for stopping execution of the image file for the first duration period; and
display a drawing output comprising the first hue and the first line width.

3. The electronic device of claim 2, wherein the instructions are configured to cause the processor to:
execute the image file so as to display a second animation of drawing a second part of the object by using a second hue and a second line width for a second duration period after the first duration period;
receive a second input for stopping execution of the image file for the second duration period; and
display a drawing output comprising the second hue and the second line width.

4. The electronic device of claim 1, wherein the instructions are configured to cause the processor to:
stop the playback, based on receiving an input for stopping playback of the image file through the display, and display the first section on the display, the first section comprising an image at a time at which the playback is stopped and a picture board arranged above the image and configured to receive a drawing input.

5. The electronic device of claim 4, wherein the instructions are configured to cause the processor to:
acquire attribute information related to a drawing tool of the image from metadata associated with the image at the time at which the playback is stopped; and
display a drawing output, to which the acquired attribute information is applied, on the picture board,
wherein the attribute information comprises at least one of a type of the drawing tool, a width of a line drawn on the picture board by the tool, a hue of the line, a brightness of the line, and a saturation of the line.

6. The electronic device of claim 4, wherein the instructions are configured to cause the processor to:
process the image at the time at which the playback is stopped so as to be visually distinguished from an image displayed on the picture board when the image file is played, and display the image at the time at which the playback is stopped on the picture board.

7. The electronic device of claim 1, wherein the instructions are configured to cause the processor to display, on the display, a button for stopping playback of the image file in the user interface, a timeline indicating an entire playback section of the image file, and a button for selecting whether or not to expose the image file, and display, based on stopping of playback of the image file, a playback button, a button for canceling the drawing output, and a button for displaying again the drawing output, on the user interface.

8. The electronic device of claim 7, wherein the instructions are configured to cause the processor to divide, based on a designated reference, the entire playback section of the image file into multiple playback sections, and perform playback from a starting time of one of the playback sections, in response to a user input, and wherein
the designated reference comprises at least one of a playback time selected by the user, a playback time at which an attribute of the drawing tool is changed, a time at which drawing of each part of the object starts, and a designated time unit.

9. The electronic device of claim 8, wherein the instructions are configured to cause the processor to display marks for identifying the playback sections on the timeline.

10. The electronic device of claim 9, wherein the instructions are configured to cause the processor to display, on the display, a drawing tool corresponding to at least one of the marks.

11. The electronic device of claim 8, wherein the instructions are configured to cause the processor to repeatedly play at least a part of one of the playback sections a predetermined number of times or until a designated user input is received.

12. The electronic device of claim 1, wherein the instructions are configured to cause the processor to display, in the first section, movement of a tool for drawing the object while playing the image file.

13. An electronic device comprising:
a touchscreen display;
a processor operatively connected to the display; and
a memory operatively connected to the processor, wherein the memory comprises instructions that, when executed, cause the processor to:
display, on the display, a user interface comprising a first section configured to receive a drawing input and a second section comprising multiple hues and one or more line widths to be selected for the drawing input;
execute an animation image file to be displayed on the first section, the animation image file comprising an order in which an object is drawn by using at least one hue among the multiple hues and at least one line width among the one or more line widths;
receive an input for stopping executing the image file from the display; and
display a drawing output on the display according to the drawing input, the drawing output comprising a hue and a line width used when the drawing input is received,
wherein the instructions are configured to cause the processor to display a hue used at a time at which the image file is played, among multiple hues displayed in the second section, so as to be distinguished from other hues.

14. A method for operating an electronic device, the method comprising:
displaying, on a touchscreen display, a user interface comprising a first section configured to receive a drawing input and a second section comprising multiple hues and one or more line widths to be selected for the drawing input;
executing an animation image file to be displayed on the first section, the animation image file comprising an order in which an object is drawn by using at least one hue among the multiple hues and at least one line width among the one or more line widths;
receiving an input for stopping executing the image file from the display; and
displaying a drawing output on the display according to the drawing input, the drawing output comprising a hue and a line width used when the drawing input is received,
wherein the method further comprises displaying, on the second section, metadata associated with an image at a current playback time in the image file, and
wherein the metadata comprises information indicating a type of a drawing tool and information indicating a hue of the image.

* * * * *